US012259568B2

(12) United States Patent
Yanai et al.

(10) Patent No.: US 12,259,568 B2
(45) Date of Patent: Mar. 25, 2025

(54) IMAGE DISPLAY APPARATUS

(71) Applicant: FUJIFILM Corporation, Tokyo (JP)

(72) Inventors: Yujiro Yanai, Minamiashigara (JP); Naoyoshi Yamada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 495 days.

(21) Appl. No.: 17/721,997

(22) Filed: Apr. 15, 2022

(65) Prior Publication Data
US 2022/0236587 A1    Jul. 28, 2022

Related U.S. Application Data

(63) Continuation of application No. PCT/JP2020/034114, filed on Sep. 9, 2020.

(30) Foreign Application Priority Data

Oct. 18, 2019  (JP) .................................. 2019-191178
Dec. 27, 2019  (JP) .................................. 2019-238175

(51) Int. Cl.
*G02B 30/56* (2020.01)
*F21V 8/00* (2006.01)

(52) U.S. Cl.
CPC ........... *G02B 30/56* (2020.01); *G02B 6/0051* (2013.01); *G02B 6/0055* (2013.01); *G02B 6/0056* (2013.01)

(58) Field of Classification Search
CPC ........ G02B 30/00; G02B 30/10; G02B 30/34; G02B 30/35; G02B 30/56; G02B 30/60;

(Continued)

(56) References Cited

U.S. PATENT DOCUMENTS 5,764,411 A * 6/1998 Shanks .................. G02B 30/56
                                                          359/530
8,651,720 B2 * 2/2014 Sherman .............. G02B 6/0055
                                                          362/560

(Continued)

FOREIGN PATENT DOCUMENTS

EP         2 317 367 A1    5/2011
JP       2010-534867 A    11/2010

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/034114, dated Apr. 28, 2022.

(Continued)

*Primary Examiner* — Sultan Chowdhury
(74) *Attorney, Agent, or Firm* — Birch, Stewart, Kolasch & Birch, LLP

(57) ABSTRACT

Provided is an image display apparatus that has a small overall apparatus volume and can be miniaturized. The image display apparatus includes an image display element; a light guide plate on which light emitted by the image display element is incident and which internally and totally reflects the light satisfying a total reflection condition to guide the light; and a retroreflective element that is provided on a surface of the light guide plate and retroreflects the light guided in the light guide plate.

16 Claims, 15 Drawing Sheets

(58) Field of Classification Search
CPC ...... G02B 5/124; G02B 5/128; G02B 5/1842;
G02B 5/3016; G02B 5/0252; G02B
5/0284; G02B 6/00; G02B 6/0025; G02B
6/0028; G02B 6/0031; G02B 6/0051;
G02B 6/0055; G02B 6/0056; H04N
13/302; H04N 13/312; H04N 13/346;
H04N 13/351; H04N 13/365
See application file for complete search history.

(56) References Cited

U.S. PATENT DOCUMENTS

| | | | |
|---|---|---|---|
| 10,627,565 B1* | 4/2020 | Trail | G02B 27/0172 |
| 2009/0027772 A1 | 1/2009 | Robinson | |
| 2014/0340749 A1 | 11/2014 | Yamada et al. | |
| 2017/0192239 A1* | 7/2017 | Nakamura | G02B 6/0036 |
| 2018/0101087 A1 | 4/2018 | Shinohara | |
| 2018/0120559 A1 | 5/2018 | Yeoh et al. | |
| 2018/0295351 A1* | 10/2018 | Ninan | H04N 5/253 |
| 2018/0299678 A1* | 10/2018 | Singer | G02B 6/005 |
| 2019/0033649 A1 | 1/2019 | Okuyama | |
| 2019/0324183 A1* | 10/2019 | Shinohara | G02B 6/003 |
| 2020/0264486 A1 | 8/2020 | Kadono et al. | |
| 2020/0326579 A1 | 10/2020 | Sato et al. | |

FOREIGN PATENT DOCUMENTS

| | | |
|---|---|---|
| JP | 2014-222302 A | 11/2014 |
| JP | 2017-142361 A | 8/2017 |
| JP | 2018-40962 A | 3/2018 |
| JP | 2019-28105 A | 2/2019 |
| WO | WO 2017/146172 A1 | 8/2017 |
| WO | WO 2019/039600 A1 | 2/2019 |
| WO | WO 2019/097895 A1 | 5/2019 |
| WO | WO 2019/131966 A1 | 7/2019 |

OTHER PUBLICATIONS

International Search Report (Form PCT/ISA/210) for International Application No. PCT/JP2020/034114, dated Nov. 10, 2020, with English translation.
Japanese Notice of Reasons for Refusal for corresponding Japanese Application No. 2021-552271, dated Sep. 20, 2022, with an English translation.

* cited by examiner

US 12,259,568 B2

IMAGE DISPLAY APPARATUS

CROSS-REFERENCE TO RELATED APPLICATIONS

This application is a Continuation of PCT International Application No. PCT/JP2020/034114 filed on Sep. 9, 2020, which claims priority under 35 U.S.C. § 119(a) to Japanese Patent Application No. 2019-191178 filed on Oct. 18, 2019 and Japanese Patent Application No. 2019-238175 filed on Dec. 27, 2019. Each of the above applications is hereby expressly incorporated by reference, in its entirety, into the present application.

BACKGROUND OF THE INVENTION

1. Field of the Invention

The present invention relates to an image display apparatus.

2. Description of the Related Art

As an example of an image display apparatus that displays an image in the air, JP2019-028105A describes a display device including an optical element which has a display unit that emits display light, a first surface, and a second surface on the opposite side of the first surface and in which the second surface is arranged so as to face the display unit and transmits or reflects the display light, a reflective element provided to face the second surface and retroreflect the display light reflected by the optical element, and a transmittance control element that changes the transmittance of the display light according to the position through which the display light is transmitted.

Such an image display apparatus retroreflects the video light by the reflective element to form an aerial image in front of the reflective element.

In addition, JP2018-040962A describes an optical device including a reflector array optical element and a surface light emitter arranged so as to face a rear surface or front surface of the reflector array optical element, in which the reflector array optical element includes a first reflective plate having a plurality of parallelly arranged first reflecting surfaces stacked with a second reflective plate having a plurality of parallelly arranged second reflecting surfaces in such a way that the first reflecting surfaces and the second reflecting surfaces are perpendicular to each other.

A display panel is arranged on one surface side of such an optical device, and the optical device (reflector array optical element) retroreflects light emitted by the display panel in a plane direction to form an aerial image in the air on the surface side opposite to the surface on the display panel side of the optical device.

SUMMARY OF THE INVENTION

In the image display apparatus of JP2019-028105A, an optical element reflects light emitted by a display unit in the direction of a retroreflective element, and the retroreflective element retroreflects the light to form an aerial image. Therefore, the display unit is arranged such that its surface is inclined with respect to the optical element, and the retroreflective element is arranged such that its surface is inclined with respect to the optical element.

In addition, in the image display apparatus having an optical device of JP2018-040962A, the optical device retroreflects light emitted by a display panel in a plane direction to form an aerial image. Therefore, the display panel is arranged such that its surface is inclined with respect to the optical device.

In an image display apparatus that displays an aerial image, the aerial image is displayed by configuring the aerial image formed by retroreflection so as not to overlap the display unit. In this regard, it is necessary to dispose the members with relative inclination in a conventional image display apparatus, which leads to a problem that the volume of the entire image display apparatus becomes large.

An object of the present invention is to solve such a problem of the related art, and to provide an image display apparatus having a small volume of the entire apparatus and capable of miniaturization.

In order to achieve the foregoing object, the present invention has the following configurations.

[1] An image display apparatus including an image display element;
  a light guide plate on which light emitted by the image display element is incident and which internally and totally reflects the light satisfying a total reflection condition to guide the light; and
  a retroreflective element that is provided on a surface of the light guide plate and retroreflects the light guided in the light guide plate.

[2] An image display apparatus including a plurality of image display elements;
  a light guide plate on which light emitted by each of the plurality of image display elements is incident and which internally and totally reflects the light satisfying a total reflection condition to guide the light; and
  at least one retroreflective element that is provided on a surface of the light guide plate and retroreflects the light guided in the light guide plate,
  in which the plurality of image display elements make light incident on the light guide plate from different positions in a plane direction of a main surface of the light guide plate.

[3] The image display apparatus according to [1] or [2], further including a diffractive reflective element that is arranged on a surface of the light guide plate opposite to the surface on which the retroreflective element is arranged, reflects the light guided in the light guide plate, and diffracts a traveling direction of the light in a direction of the retroreflective element at an angle deviating from the total reflection condition.

[4] The image display apparatus according to [3], in which the light guided in the light guide plate is circularly polarized light, and
  the diffractive reflective element has circularly polarized light selectivity.

[5] The image display apparatus according to any one of [1] to [4], in which the retroreflective element includes a half mirror having circularly polarized light selectivity.

[6] The image display apparatus according to [3], in which the light guided in the light guide plate is linearly polarized light, and
  the diffractive reflective element has linearly polarized light selectivity.

[7] The image display apparatus according to any one of [1] to [3] and [6], in which the retroreflective element includes a half mirror having linearly polarized light selectivity.

[8] The image display apparatus according to any one of [1] to [7], in which one of side surfaces of the light guide plate is an incident surface on which the light emitted by the image display element is incident, and the incident surface is inclined with respect to the surface of the light guide plate such that the incident light is incident at an angle satisfying the total reflection condition.

[9] The image display apparatus according to any one of [1] to [7], in which one surface of the light guide plate is an incident surface on which the light emitted by the image display element is incident, and the image display apparatus has a diffractive element that diffracts the light emitted by the image display element at an angle satisfying the total reflection condition on the incident surface or a surface of the light guide plate facing the incident surface.

According to an aspect of the present invention, it is possible to provide an image display apparatus having a small volume of the entire apparatus and capable of miniaturization.

DESCRIPTION OF THE PREFERRED EMBODIMENTS

Hereinafter, the image display apparatus according to the embodiment of the present invention will be described in detail based on the suitable working examples shown in the accompanying drawings.

In the present specification, any numerical range expressed by using "to" means a range including the numerical values before and after the "to" as a lower limit value and an upper limit value, respectively.

In the present specification, the term "(meth)acrylate" is used to mean "either or both of acrylate and methacrylate".

In the present specification, the selective reflection center wavelength refers to an average value of two wavelengths having a half-value transmittance: $T1/2(\%)$ expressed by the following formula, in a case where a minimum value of the transmittance in a target object (member) is Tmin (%).

Formula for calculating half-value transmittance:
$T1/2=100-(100-Tmin)/2$

In addition, the expression that selective reflection center wavelengths of a plurality of layers are "equal" does not mean that those wavelengths are exactly the same, and an error in a range that is not optically affected is acceptable. Specifically, the expression that selective reflection center wavelengths of a plurality of objects are "equal" means that a difference between the selective reflection center wavelengths of each object is 20 nm or less. The difference is preferably 15 nm or less and more preferably 10 nm or less.

[Image Display Apparatus]

The image display apparatus of the first embodiment of the present invention is an image display apparatus including an image display element; a light guide plate on which light emitted by the image display element is incident and which internally and totally reflects the light satisfying a total reflection condition to guide the light; and a retroreflective element that is provided on a surface of the light guide plate and retroreflects the light guided in the light guide plate.

Figure 1:
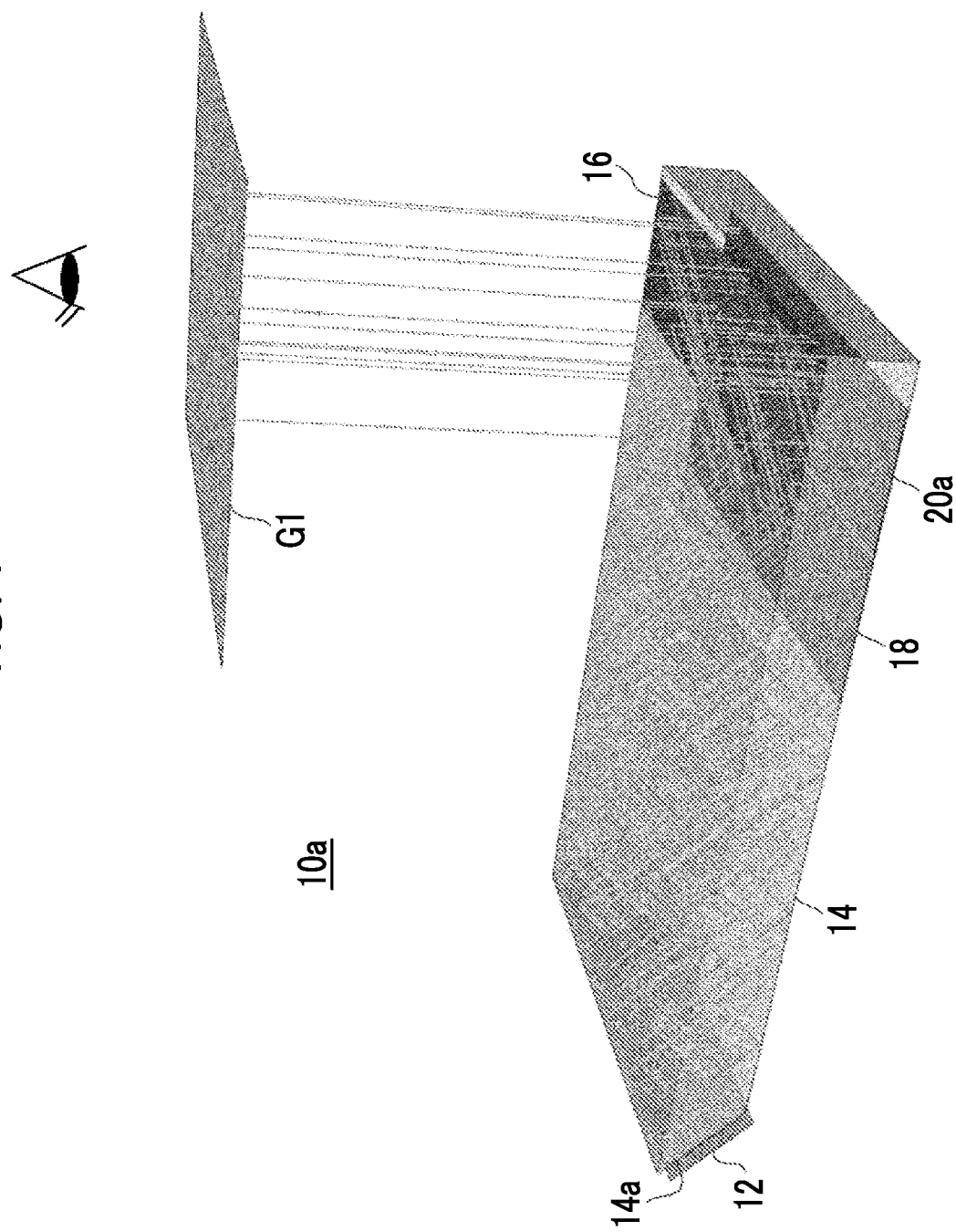
FIG. 1 is a perspective view schematically showing an example of an image display apparatus of the present invention.
Figure 2:
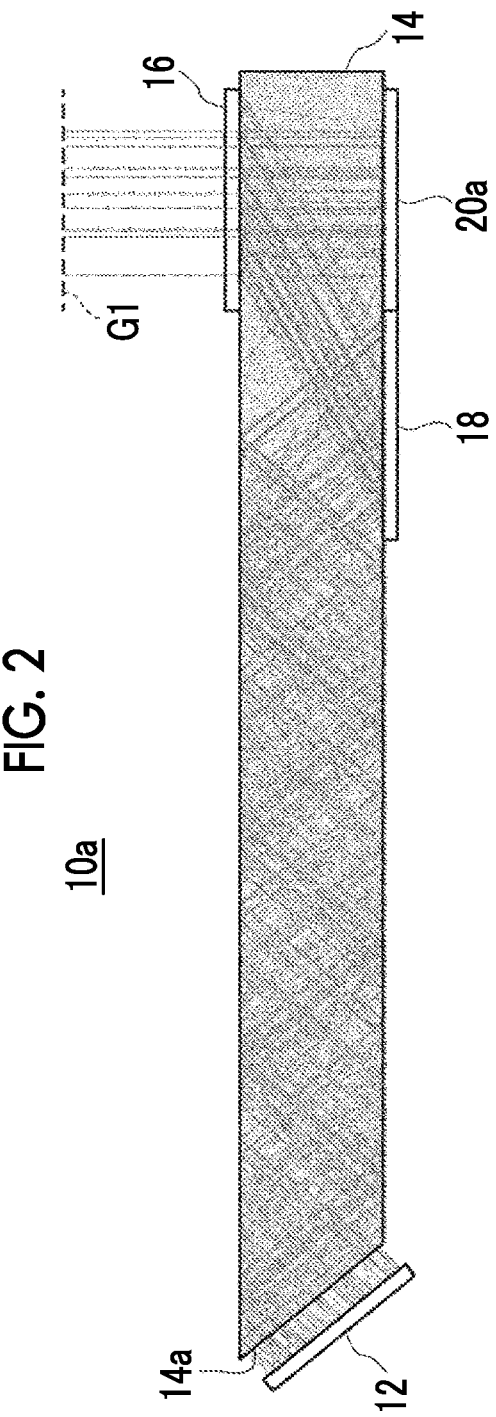
FIG. 2 is a cross-sectional view of the image display apparatus shown in FIG. 1.

FIG. 1 conceptually shows an example of the image display apparatus according to the embodiment of the present invention. FIG. 2 shows a cross-sectional view of the image display apparatus shown in FIG. 1.

An image display apparatus 10a shown in FIG. 1 and FIG. 2 includes an image display element 12, a light guide plate 14, a first diffractive reflective element 16, a second diffractive reflective element 18, and a retroreflective element 20a. The first diffractive reflective element 16 and the second diffractive reflective element 18 are elements that reflect incident light while diffracting the light. The retroreflective element 20a is an element that retroreflects incident light, that is, reflects incident light in an incident direction.

In the image display apparatus 10a, the image display element 12 is arranged to face one side surface of the light guide plate 14 (hereinafter, also referred to as an incident surface 14a), the first diffractive reflective element 16 is arranged on one main surface (maximum surface) of the end part of the light guide plate 14 opposite to the incident surface 14a, and the retroreflective element 20a is arranged on the other main surface. In addition, the second diffractive reflective element 18 is arranged in the vicinity of the retroreflective element 20a on the main surface of the light guide plate on which the retroreflective element 20a is arranged.

In the image display apparatus 10a, the incident surface 14a of the light guide plate 14 is inclined with respect to the main surface such that the incident light is incident at an angle satisfying the total reflection condition. The total reflection condition is a condition of an angle at which the light incident on the light guide plate 14 is repeatedly totally reflected on each of two main surfaces to guide the light inside the light guide plate.

In a case where light (image light) emitted by the image display element 12 is incident on the light guide plate 14 from the inclined incident surface 14a, the light is totally reflected inside the light guide plate 14 on both main surfaces (interfaces) and is then guided in the direction of the side surface opposite to the incident surface 14a. The light guided in the light guide plate 14 is incident on the second diffractive reflective element 18 and diffracted and reflected in the direction of the first diffractive reflective element 16. The light reflected by the second diffractive reflective element 18 and incident on the first diffractive reflective element 16 is diffracted in the traveling direction of the light at an angle deviating from the total reflection condition in the light guide plate. The light reflected by the first diffractive reflective element 16 is incident on the retroreflective element 20a and then retroreflected. The light reflected by the retroreflective element 20a is incident on the first diffractive reflective element 16, but is deviated from the total reflection condition, and a part of the light transmits through the first diffractive reflective element 16, so that the light is emitted to the outside from the light guide plate 14. The light emitted from the light guide plate 14 by the reflection by the retroreflective element 20a forms an aerial image G1 on an optical path thereof.

As shown in FIG. 1, the image display element 12 emits planar light (image); the light emitted from each point on the display surface of the image display element 12 is guided inside the light guide plate 14, diffracted and reflected by the second diffractive reflective element 18 and the first diffractive reflective element 16, and retroreflected by the retroreflective element 20a; and then the image emitted by the image display element 12 is displayed as an aerial image G1 in the space outside the light guide plate 14.

Here, the light emitted from each point on the display surface of the image display element 12 is emitted in various directions. The light emitted from a certain one point is guided through different paths in the light guide plate 14, diffracted and reflected by the second diffractive reflective element 18 and the first diffractive reflective element 16, and then retroreflected by the retroreflective element 20a. Each light retroreflected by the retroreflective element 20a gathers (images) at one point at a position (in the air) at a distance substantially the same as an optical path length from the image display element 12 to the retroreflective element 20a (distance from the retroreflective element 20a). As a result, it is visually recognized that the light is emitted from the one point.

In this manner, the light emitted from each point on the display surface of the image display element 12 is retroreflected by the retroreflective element 20a and is imaged at each specific point in the air. Each light is imaged in a planar shape, whereby the image emitted by the image display element 12 is formed as an aerial image G1.

Here, as described above, a conventional image display apparatus that displays an aerial image has a problem that the volume of the entire image display apparatus increases, since it is necessary to arrange the members, such as an image display element and a retroreflective element, an image display element and an optical element, and a retroreflective element and an optical element, at a relative inclination. In addition, it is necessary to arrange the image display element and the retroreflective element apart from each other, in order to secure an optical path length. This leads to a problem that the volume of the entire image display apparatus increases.

On the other hand, in the image display apparatus according to the embodiment of the present invention, the light emitted by the image display element is guided by the light guide plate and is then incident on the retroreflective element. Therefore, the volume of the entire image display apparatus can be reduced since there is no limitation on the relative inclination between the image display element and the retroreflective element. In addition, since the light emitted by the image display element is guided by the light guide plate, the optical path length can be secured without increasing the volume and therefore the volume of the entire image display apparatus can be reduced.

In addition, as described above, in a case where an aerial image is formed using the retroreflective element, the optical path length from the image display element to the retroreflective element and the distance from the retroreflective element to the position where the aerial image is formed are substantially the same. Therefore, in a conventional image display apparatus, it is necessary to increase the distance between the image display element and the retroreflective element, in order to form an aerial image at a position farther away from the image display apparatus, which leads to a problem that the volume of the entire image display apparatus increases.

On the other hand, the image display apparatus according to the embodiment of the present invention guides the light emitted by the image display element while totally reflecting the light in the light guide plate, so it is possible to secure the optical path length from the image display element to the retroreflective element, an aerial image can be formed at a position farther from the image display apparatus without increasing the volume of the entire image display apparatus.

In the examples shown in FIG. 1 and FIG. 2, the incident surface 14a is inclined in a direction in which the angle formed by the main surface on which the first diffractive reflective element 16 is arranged is an acute angle, but the present invention is not limited thereto. The incident surface 14a may be inclined in a direction in which the angle formed by the main surface on which the retroreflective element 20a is arranged is an acute angle.

The inclined angle of the incident surface 14a with respect to the main surface may be inclined at an angle at which the incident light is incident at an angle satisfying the total reflection condition, and may be appropriately set according to the refractive index of the light guide plate or the like.

Here, in the examples shown in FIG. 1 and FIG. 2, it is configured to have a second diffractive reflective element 18 that diffracts the light guided in the light guide plate 14 toward the direction of the first diffractive reflective element 16, but the present invention is not limited thereto. It may be configured such that the light guided in the light guide plate 14 is directly incident on the first diffractive reflective element 16 without having the second diffractive reflective element 18.

Including the second diffractive reflective element 18 makes it possible to efficiently illuminate the retroreflective element. In addition, the image can be enlarged or reduced as needed.

In addition, in the examples shown in FIG. 1 and FIG. 2, it is configured such that one of the side surfaces of the light guide plate 14 is set as the incident surface 14a, and the incident surface 14a is inclined with respect to the main surface of the light guide plate 14 such that the light incident on the incident surface 14a is incident at an angle satisfying the total reflection condition, but the present invention is not limited thereto.

It may be configured such that one main surface of the light guide plate is set as an incident surface on which the light emitted by the image display element is incident, and a diffractive element that diffracts the light emitted by the image display element at an angle satisfying the total reflection condition is provided on the incident surface or the main surface facing the incident surface.

Figure 3:
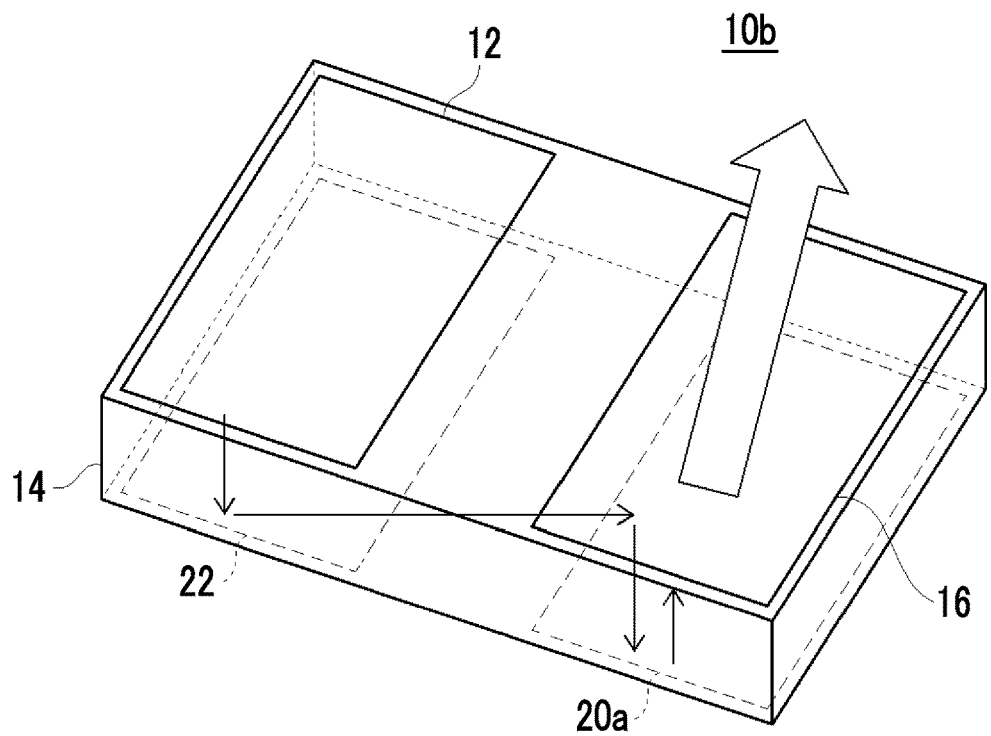
FIG. 3 is a perspective view schematically showing another example of the image display apparatus of the present invention.
Figure 4:
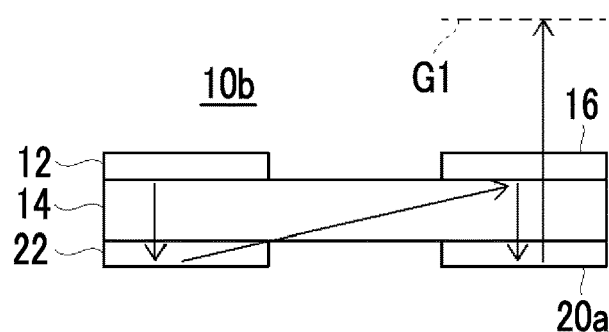
FIG. 4 is a cross-sectional view of the image display apparatus shown in FIG. 3.

FIG. 3 shows a perspective view schematically showing another example of the image display apparatus according to the embodiment of the present invention. FIG. 4 shows a cross-sectional view of the image display apparatus shown in FIG. 3.

An image display apparatus 10b shown in FIG. 3 and FIG. 4 includes an image display element 12, a light guide plate 14, an incident diffractive element 22, a first diffractive reflective element 16, and a retroreflective element 20a. The incident diffractive element 22 is an element that diffracts and reflects the incident light.

In the image display apparatus 10b, the image display element 12 is arranged so as to face one main surface of one end part side (left end part side in FIG. 4) of the light guide plate 14. In addition, the incident diffractive element 22 is arranged so as to face the image display element 12 on the main surface of the light guide plate 14 opposite to the main surface on which the image display element 12 is arranged. The first diffractive reflective element 16 is arranged on one main surface of the other end part side (right end part side in FIG. 4) of the light guide plate 14. In addition, the retroreflective element 20a is arranged so as to face the first diffractive reflective element 16 on the main surface of the light guide plate 14 opposite to the main surface on which the first diffractive reflective element 16 is arranged.

In the image display apparatus 10b, in a case where the light (image light) emitted by the image display element 12 is incident on the light guide plate 14 from the main surface, the light travels in the light guide plate 14 and is incident on the incident diffractive element 22 arranged on the opposite main surface. The light incident on the incident diffractive element 22 is diffracted and reflected at an angle satisfying the total reflection condition. The light reflected by the incident diffractive element 22 is totally reflected inside the light guide plate 14 on both main surfaces (interfaces) and is then guided to the other end part side. The light guided in the light guide plate 14 is incident on the first diffractive reflective element 16. The light incident on the first diffractive reflective element 16 is diffracted in the traveling direction of the light at an angle deviating from the total reflection condition in the light guide plate. The light reflected by the first diffractive reflective element 16 is incident on the retroreflective element 20a and then retroreflected. The light reflected by the retroreflective element 20a is incident on the first diffractive reflective element 16, but is deviated from the total reflection condition, and a part of the light transmits through the first diffractive reflective element 16, so that the light is emitted to the outside from the light guide plate 14. The light emitted from the light guide plate 14 by the reflection by the retroreflective element 20a forms an aerial image G1 on an optical path thereof.

As described above, in a case of the configuration in which the light emitted by the image display element 12 is diffracted at an angle satisfying the total reflection condition by using the incident diffractive element 22, the members of the image display element 12, the incident diffractive element 22, the first diffractive reflective element 16, and the retroreflective element 20a can be arranged substantially in parallel. Therefore, the image display apparatus 10b can be made thinner, and the volume of the entire apparatus can be made smaller.

In FIG. 3 and FIG. 4, the light is indicated by one arrow for the sake of simplification of the figure, but in the same manner as shown in FIG. 1 and FIG. 2, planar light is emitted from the image display element 12, and the light emitted from each point on the display surface of the image display element 12 is guided by the above path. In addition, in FIG. 3 and FIG. 4, for the sake of simplification of the figure, the light directed from the incident diffractive element 22 toward the first diffractive reflective element 16 is indicated by one arrow directly directed from the incident diffractive element 22 toward the first diffractive reflective element 16, but in the same manner as shown in FIG. 1 and FIG. 2, the light is guided while being totally reflected on both main surfaces (interfaces) in the light guide plate 14 and is directed from the incident diffractive element 22 toward the first diffractive reflective element 16.

The same applies to FIG. 5 to FIG. 9 and FIG. 30 to FIG. 33, which will be described later, with respect to these points.

Here, in the examples shown in FIG. 3 and FIG. 4, it is configured such that the first diffractive reflective element 16 is arranged on the main surface of the light guide plate 14 on the side where the image display element 12 is arranged, and the retroreflective element 20a is arranged on the main surface of the light guide plate 14 on which the incident diffractive element 22 is arranged, but the present invention is not limited thereto. It may be configured such that the first diffractive reflective element 16 is arranged on the main surface of the light guide plate 14 on which the incident diffractive element 22 is arranged, and the retroreflective element 20a is arranged on the main surface of the light guide plate 14 on the side where the image display element 12 is arranged.

In addition, in a case of the configuration having the incident diffractive element 22, another layer may be provided between the incident diffractive element 22 and the image display element 12. For example, in a case where the incident diffractive element 22 has circularly polarized light selectivity, a layer for converting the incident light into circularly polarized light may be provided between the incident diffractive element 22 and the image display element 12.

Figure 5:
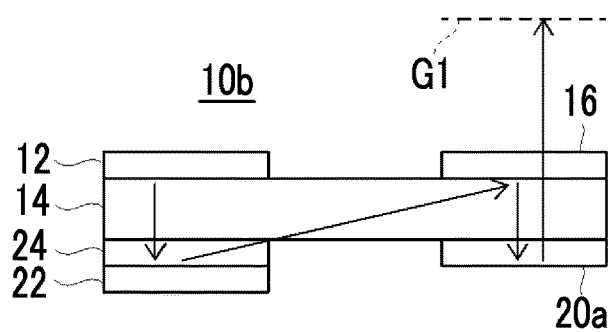
FIG. 5 is a cross-sectional view schematically showing another example of the image display apparatus of the present invention.

For example, an image display apparatus 10c shown in FIG. 5 is a case where the image display element 12 emits linearly polarized light, or a case having a linearly polarizing plate on the display surface side of the image display element 12, and has a λ/4 plate 24 between the incident diffractive element 22 and the light guide plate 14. The linearly polarized light emitted from the image display element 12 (or converted by the linearly polarizing plate) is converted into circularly polarized light by the λ/4 plate 24 and is then incident on the incident diffractive element 22. Since the incident diffractive element 22 has circularly polarized light selectivity, the incident diffractive element 22 reflects the light in a case where the turning direction of the incident circularly polarized light coincides with the turning direction of the circularly polarized light reflected by the incident diffractive element 22. Therefore, the λ/4 plate 24 is arranged so as to convert the linearly polarized light emitted from the image display element 12 into circularly polarized light in the turning direction reflected by the incident diffractive element 22.

In addition, in the examples shown in FIG. 4 and FIG. 5, an element that diffracts and reflects the incident light is used as the incident diffractive element 22, but the present invention is not limited thereto. A transmissive type diffractive element that diffracts and transmits the incident light may be used as the incident diffractive element. In a case where a transmissive type diffractive element is used, the incident diffractive element may be arranged between the image display element 12 and the light guide plate 14 (see FIG. 8).

In addition, in a case of the configuration using the first diffractive reflective element 16, the light retroreflected by the retroreflective element 20a is incident on the first diffractive reflective element 16 and emitted to the outside. At that time, a part of the retroreflected light may be diffracted and reflected by the first diffractive reflective element 16 and not emitted from the light guide plate 14. Therefore, an element having circularly polarized light selectivity is used as the first diffractive reflective element 16, and a phase difference plate is arranged between the retroreflective element 20a and the light guide plate 14, whereby it may be configured to convert the circularly polarized light retroreflected by the retroreflective element 20a into light that is not diffracted and reflected by the first diffractive reflective element 16.

For example, the turning direction of the circularly polarized light retroreflected by the retroreflective element 20a is reversed by arranging a λ/2 plate between the retroreflective element 20a and the light guide plate 14, so that the light retroreflected by the retroreflective element 20a can be emitted to the outside of the light guide plate 14 without being diffracted and reflected by the first diffractive reflective element 16.

In addition, the circularly polarized light retroreflected by the retroreflective element 20a is converted into linearly polarized light by arranging a λ/4 plate between the retroreflective element 20a and the light guide plate 14, so that the light retroreflected by the retroreflective element 20a can be emitted to the outside of the light guide plate 14 without being diffracted and reflected by the first diffractive reflective element 16.

This makes it possible to improve efficiency.

The above example is configured such that the light guided in the light guide plate is circularly polarized light, and the diffractive reflective element has circularly polarized light selectivity, but the present invention is not limited thereto. It may be configured such that the light guided in the light guide plate is linearly polarized light, and the diffractive reflective element has linearly polarized light selectivity.

In addition, in the examples shown in FIG. 3 and FIG. 4, it is configured such that the light guided in the light guide plate 14 is diffracted and reflected by the first diffractive reflective element 16 and then incident on the retroreflective element 20a, but the present invention is not limited thereto. It may be configured such that the light guided in the light guide plate 14 is directly incident on the retroreflective element 20a without the first diffractive reflective element 16.

Figure 6:
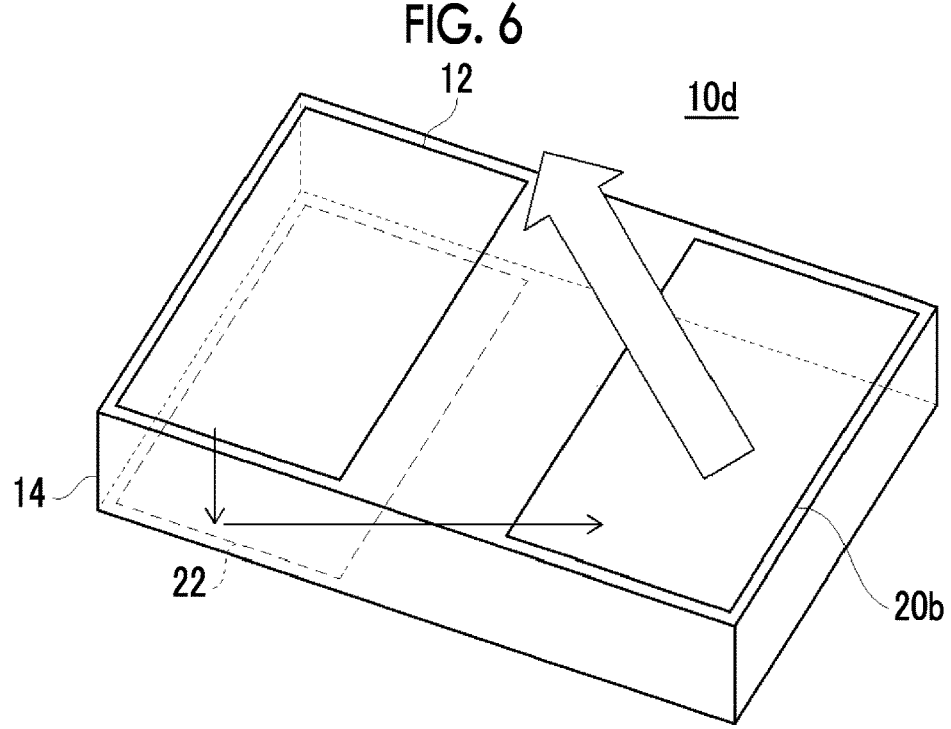
FIG. 6 is a perspective view schematically showing another example of the image display apparatus of the present invention.
Figure 7:
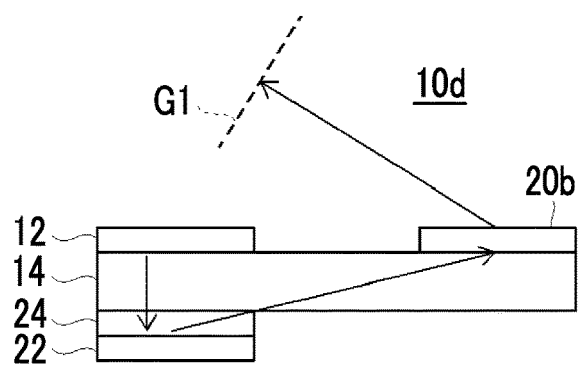
FIG. 7 is a cross-sectional view of the image display apparatus shown in FIG. 6.

FIG. 6 shows a perspective view schematically showing another example of the image display apparatus according to the embodiment of the present invention. FIG. 7 shows a cross-sectional view of the image display apparatus shown in FIG. 6.

An image display apparatus 10d shown in FIG. 6 and FIG. 7 includes an image display element 12, a light guide plate 14, a λ/4 plate 24, an incident diffractive element 22, and a retroreflective element 20b. It should be noted that the illustration of the λ/4 plate 24 is omitted in FIG. 6. The retroreflective element 20b is an element that retroreflects incident light in a plane direction and specularly reflects the incident light in a thickness direction.

The image display apparatus 10d has the same configuration as the image display apparatus 10c shown in FIG. 5, except that the first diffractive reflective element 16 is not provided and the retroreflective element 20b is provided instead of the retroreflective element 20a. In addition, in FIG. 6 and FIG. 7, it is configured such that the retroreflective element 20b is arranged on the main surface of the light guide plate 14 on the side where the image display element 12 is arranged, but the present invention is not limited thereto. It may be configured such that the retroreflective element 20b is arranged on the main surface of the light guide plate 14 on which the incident diffractive element 22 is arranged.

In the image display apparatus 10d, in a case where the light (image light) emitted by the image display element 12 is incident on the light guide plate 14 from the main surface, the light travels in the light guide plate 14 and is incident on the incident diffractive element 22 arranged on the opposite main surface. The light incident on the incident diffractive element 22 is diffracted and reflected at an angle satisfying the total reflection condition. The light reflected by the incident diffractive element 22 is totally reflected inside the light guide plate 14 on both main surfaces (interfaces) and is then guided to the other end part side. The light guided in the light guide plate 14 is incident on the retroreflective element 20b and then retroreflected. The light reflected by the retroreflective element 20b is retroreflected in a plane direction, but is specularly reflected in a thickness direction, and is therefore emitted to the outside from the light guide plate 14. The light emitted from the light guide plate 14 by the reflection by the retroreflective element 20b forms an aerial image G1 on an optical path thereof.

As described above, it can be configured such that the first diffractive reflective element 16 is not provided, by using a retroreflective element that retroreflects the incident light in a plane direction and specularly reflects the incident light in a thickness direction.

In addition, in the example shown in FIG. 7, an element that diffracts and reflects the incident light is used as the incident diffractive element, but the present invention is not limited thereto. A transmissive type diffractive element that diffracts and transmits the incident light may be used as the incident diffractive element. In a case where a transmissive type diffractive element is used, the incident diffractive element may be arranged between the image display element 12 and the light guide plate 14.

Figure 8:
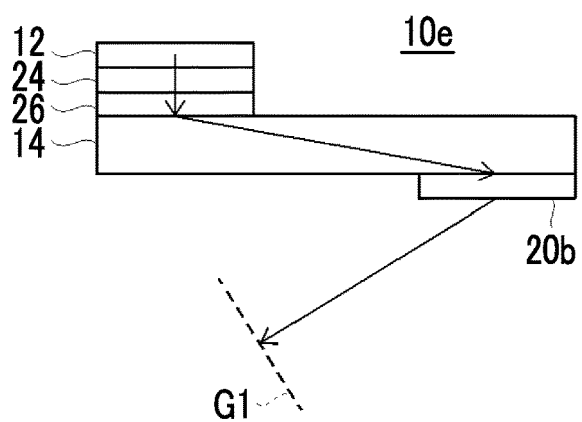
FIG. 8 is a cross-sectional view schematically showing another example of the image display apparatus of the present invention.

FIG. 8 is a cross-sectional view showing another example of the image display apparatus according to the embodiment of the present invention.

An image display apparatus 10e shown in FIG. 8 includes an image display element 12, a λ/4 plate 24, an incident diffractive element 26, a light guide plate 14, and a retroreflective element 20b. The incident diffractive element 26 is a transmissive type diffractive element that diffracts and transmits the incident light. In addition, in the example shown in FIG. 8, the image display element 12 emits linearly polarized light, and the incident diffractive element 26 is a diffractive element having circularly polarized light selectivity.

The image display apparatus 10e has the same configuration as the image display apparatus 10d shown in FIG. 7, except that the transmissive type incident diffractive element 26 is provided instead of the reflective type incident diffractive element 22, and the λ/4 plate 24 and the incident diffractive element 26 are arranged between the image display element 12 and the light guide plate 14. In addition, in the example shown in FIG. 8, it is configured such that the retroreflective element 20b is arranged on the main surface of the light guide plate 14 opposite to the main surface on the side where the image display element 12 is arranged, but the present invention is not limited thereto. It may be configured such that the retroreflective element 20b is arranged on the main surface of the light guide plate 14 on the side where the image display element 12 is arranged.

In the image display apparatus 10e, the light (image light) emitted by the image display element 12 is converted into circularly polarized light by the λ/4 plate 24, and is diffracted and transmitted by the incident diffractive element 26 having circularly polarized light selectivity at an angle satisfying the total reflection condition. The light diffracted by the incident diffractive element 26 is incident on the light guide plate 14, is totally reflected inside the light guide plate 14 on both main surfaces (interfaces), and is then guided to the other end part side. The light guided in the light guide plate 14 is incident on the retroreflective element 20b and then retroreflected. The light reflected by the retroreflective element 20b is retroreflected in a plane direction, but is specularly reflected in a thickness direction, and is therefore emitted to the outside from the light guide plate 14. The light emitted from the light guide plate 14 by the reflection by the retroreflective element 20b forms an aerial image G1 on an optical path thereof.

In addition, in the examples shown in FIG. 7 and FIG. 8, it is configured such that the first diffractive reflective element 16 is not provided by using the retroreflective element 20b that retroreflects the incident light in a plane direction and specularly reflects the incident light in a thickness direction, but the present invention is not limited thereto.

Figure 9:
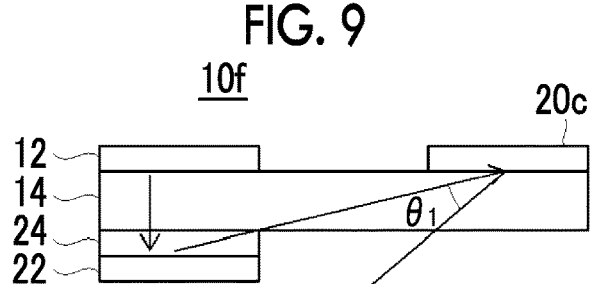
FIG. 9 is a cross-sectional view schematically showing another example of the image display apparatus of the present invention.

FIG. 9 is a cross-sectional view showing another example of the image display apparatus according to the embodiment of the present invention.

An image display apparatus 10f shown in FIG. 9 includes an image display element 12, a light guide plate 14, a λ/4 plate 24, an incident diffractive element 22, and a retroreflective element 20c. The retroreflective element 20c is a retroreflective element that reflects the incident light in an incident direction, and is a retroreflective element in which the direction of retroreflection is deviated from the incident direction by several degrees. In addition, in the example shown in FIG. 9, the image display element 12 emits linearly polarized light, and the incident diffractive element 22 is a diffractive element having circularly polarized light selectivity.

In the image display apparatus 10f, in a case where the light (image light) emitted by the image display element 12 is incident on the light guide plate 14 from the main surface, the light travels in the light guide plate 14, is converted into circularly polarized light by the λ/4 plate 24 arranged on the opposite main surface, and is then incident on the incident diffractive element 22. The light incident on the incident diffractive element 22 is diffracted and reflected at an angle satisfying the total reflection condition. The light reflected by the incident diffractive element 22 is totally reflected inside the light guide plate 14 on both main surfaces (interfaces) and is then guided to the other end part side. The light guided in the light guide plate 14 is incident on the retroreflective element 20c and then retroreflected. At that time, the retroreflective element 20c retroreflects the incident light in a direction deviated by an angle $\theta_1$ with respect to the incident direction. The angle $\theta_1$ is the difference between the angle of the incident light in an incident direction (elevation angle) with respect to the surface of the retroreflective element 20c and the angle of the reflected light in a reflection direction (elevation angle) with respect to the surface of the retroreflective element 20c. As shown in FIG. 9, the retroreflective element 20c shifts the reflection direction of the reflected light such that the angle of the reflected light with respect to the surface of the retroreflective element 20c is larger than the angle of the incident light with respect to the surface of the retroreflective element 20c.

The light reflected by the retroreflective element 20c reaches the main surface of the light guide plate 14. At that time, the light is emitted to the outside from the light guide plate 14 without being totally reflected on the main surface of the light guide plate 14 by shifting the reflection direction by the retroreflective element 20c such that the incidence angle of the light with respect to the main surface of the light guide plate 14 deviates from the total reflection condition. The light emitted from the light guide plate 14 by the reflection by the retroreflective element 20c forms an aerial image G1 on an optical path thereof.

As described above, it can be configured such that the first diffractive reflective element 16 is not provided, by using a retroreflective element that retroreflects the incident light in the direction deviated by several degrees.

In order to ensure that the incidence angle of light with respect to the main surface of the light guide plate 14 deviates from the total reflection condition, it is preferable that the deviation (angle $\theta_1$) in the reflection direction by the retroreflective element 20c is large. On the other hand, in a case where the deviation in the reflection direction by the retroreflective element 20c is large, it becomes difficult to form the aerial image G1. From this point of view, the angle $\theta_1$ formed by the angle of the incident light in an incident direction (elevation angle) with respect to the surface of the retroreflective element 20c and the angle of the reflected light in a reflection direction (elevation angle) with respect to the surface of the retroreflective element 20c is preferably 4° to 30° and more preferably 8° to 26°.

Here, the image display apparatus of the second embodiment of the present invention is an image display apparatus including a plurality of image display elements; a light guide plate on which light emitted by each of the plurality of image display elements is incident and which internally and totally reflects the light satisfying a total reflection condition to guide the light; and at least one retroreflective element that is provided on a surface of the light guide plate and retroreflects the light guided in the light guide plate, in which the plurality of image display elements make light incident on the light guide plate from different positions in a plane direction of a main surface of the light guide plate.

Figure 30:
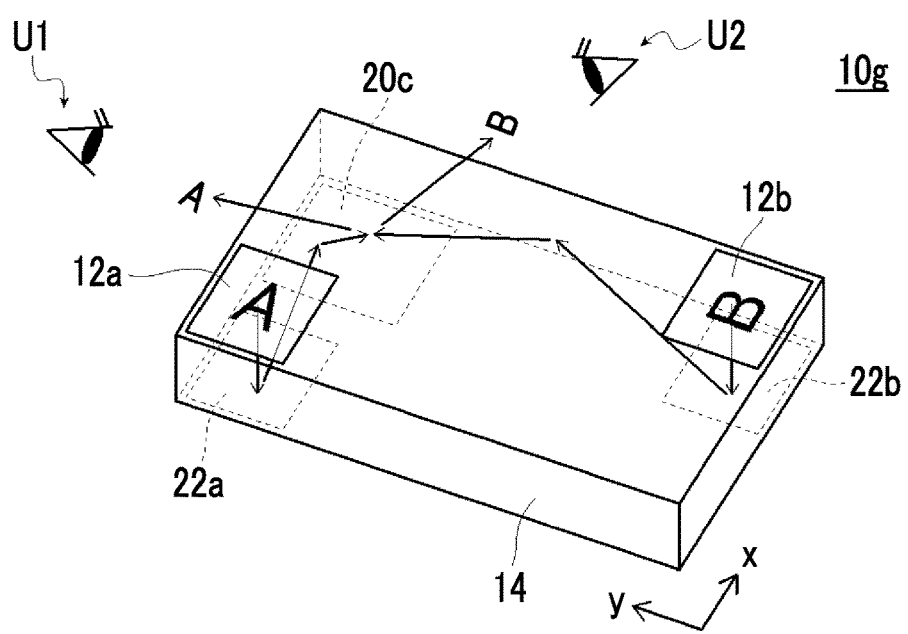
FIG. 30 is a perspective view schematically showing another example of the image display apparatus of the present invention.

FIG. 30 conceptually shows another example of the image display apparatus according to the embodiment of the present invention.

An image display apparatus 10g shown in FIG. 30 includes an image display element 12a, an image display element 12b, a light guide plate 14, an incident diffractive element 22a, an incident diffractive element 22b, and a retroreflective element 20c. The incident diffractive element 22a and the incident diffractive element 22b are elements that diffract and reflect the incident light. The retroreflective element 20c is a retroreflective element that reflects the incident light in an incident direction, and is a retroreflective element in which the direction of retroreflection is deviated from the incident direction by several degrees.

In FIG. 30, assuming that one direction of the main surface of the light guide plate 14 is an x direction and the direction orthogonal to the x direction is a y direction, the image display element 12a is arranged at the lower end part in the x direction and the left end part in the y direction on one main surface of the light guide plate 14 in FIG. 30. In addition, the image display element 12b is arranged at the upper end part in the x direction and the right end part in the y direction on one main surface of the light guide plate 14 in FIG. 30. That is, in the image display apparatus 10g, the image display element 12a and the image display element 12b are arranged at different positions in the plane direction of the main surface of the light guide plate 14, and light is incident on the light guide plate 14 from different positions.

The incident diffractive element 22a is arranged at the lower end part in the x direction and the left end part in the y direction on the other main surface of the light guide plate 14 in FIG. 30. That is, the incident diffractive element 22a is arranged at a position overlapping the image display element 12a in the plane direction of the main surface of the light guide plate 14. In addition, the incident diffractive element 22b is arranged at the upper end part in the x direction and the right end part in the y direction on the other main surface of the light guide plate 14 in FIG. 30. That is, the incident diffractive element 22b is arranged at a position overlapping the image display element 12b in the plane direction of the main surface of the light guide plate 14.

The retroreflective element 20c is arranged at the upper end part in the x direction and the left end part in the y direction on the other main surface of the light guide plate 14 in FIG. 30.

In the image display apparatus 10g having such a configuration, in a case where the light (image light) emitted by the image display element 12a is incident on the light guide plate 14 from the main surface, the light travels in the light guide plate 14 and is incident on the incident diffractive element 22a arranged on the opposite main surface. The light incident on the incident diffractive element 22a is diffracted and reflected at an angle satisfying the total reflection condition. The light reflected by the incident diffractive element 22a is totally reflected inside the light guide plate 14 on both main surfaces (interfaces) and is then guided toward the upper side in the x direction. The light guided in the light guide plate 14 is incident on the retroreflective element 20c and then retroreflected. At that time, the retroreflective element 20c retroreflects the incident light in a direction deviated by several degrees with respect to the incident direction. The light reflected by the retroreflective element 20c reaches the main surface of the light guide plate 14. At that time, the light is emitted to the outside from the light guide plate 14 without being totally reflected on the main surface of the light guide plate 14 by shifting the reflection direction (angle) by the retroreflective element 20c such that the incidence angle of the light with respect to the main surface of the light guide plate 14 deviates from the total reflection condition. The light emitted from the light guide plate 14 by the reflection by the retroreflective element 20c forms an aerial image on an optical path thereof. For example, the image display element 12a emits the image of the character A, and the aerial image of the character A is displayed. As shown by U1 in FIG. 30, the aerial image of the character A is visible in a case where the image display apparatus 10g is viewed from the lower side in the x direction, and is not visible in a case where the image display apparatus 10g is viewed from another direction (for example, in a case where the image display apparatus 10g is viewed from the direction of U2).

In addition, in a case where the light (image light) emitted by the image display element 12b is incident on the light guide plate 14 from the main surface, the light travels in the light guide plate 14 and is incident on the incident diffractive element 22b arranged on the opposite main surface. The light incident on the incident diffractive element 22b is diffracted and reflected at an angle satisfying the total reflection condition. The light reflected by the incident diffractive element 22b is totally reflected inside the light guide plate 14 on both main surfaces (interfaces) and is then guided toward the left side in the y direction. The light guided in the light guide plate 14 is incident on the retroreflective element 20c and then retroreflected. At that time, the retroreflective element 20c retroreflects the incident light in a direction deviated by several degrees with respect to the incident direction. The light reflected by the retroreflective element 20c reaches the main surface of the light guide plate 14. At that time, the light is emitted to the outside from the light guide plate 14 without being totally reflected on the main surface of the light guide plate 14 by shifting the reflection direction (angle) by the retroreflective element 20c such that the incidence angle of the light with respect to the main surface of the light guide plate 14 deviates from the total reflection condition. The light emitted from the light guide plate 14 by the reflection by the retroreflective element 20c forms an aerial image on an optical path thereof. For example, the image display element 12b emits the image of the character B, and the aerial image of the character B is displayed. As shown by U2 in FIG. 30, the aerial image of the character B is visible in a case where the image display apparatus 10g is viewed from the right side in the y direction, and is not visible in a case where the image display apparatus 10g is viewed from another direction (for example, in a case where the image display apparatus 10g is viewed from the direction of U1).

As described above, the image display apparatus 10g has two image display elements, and guides the images emitted by the two image display elements through different paths in the light guide plate, reflects the guided images by one retroreflective element, and displays aerial images in different directions. At that time, in a case where the two image display elements emit different images, different aerial images are observed depending on the observation direction. The image display apparatus that displays different aerial images depending on the observation direction in this manner is used, for example, as a head-up display for a motor vehicle, and can display different aerial images on the driver's seat side and the passenger's seat side.

In the example shown in FIG. 30, it is configured such that two image display elements are provided, but the present invention is not limited thereto. It may be configured such that three or more image display elements are provided. Even in a case of the configuration having three or more image display elements, it may be configured such that each image display element is arranged at a different position in the plane direction of the light guide plate, and the images emitted by each image display element are guided through different paths in the light guide plate, so that the guided images are reflected by one retroreflective element and aerial images are displayed in different directions.

In addition, in the example shown in FIG. 30, an element that diffracts and reflects the incident light is used as the incident diffractive element 22a and the incident diffractive element 22b, but the present invention is not limited thereto. A transmissive type diffractive element that diffracts and transmits the incident light may be used as the incident diffractive element. In a case where a transmissive type diffractive element is used, the incident diffractive element may be arranged between the image display element and the light guide plate.

In addition, in the configuration having a plurality of image display elements, each image display element may be one that emits unpolarized light, one that emits linearly polarized light, or one that emits circularly polarized light. In addition, each image display element may be one that emits light in a different polarization state. For example, in the example shown in FIG. 30, the image display element 12a may be one that emits linearly polarized light, and the image display element 12b may be one that emits circularly polarized light. Alternatively, the image display element 12a may be one that emits dextrorotatory circularly polarized light, and the image display element 12b may be one that emits levorotatory circularly polarized light.

In addition, in the configuration having a plurality of incident diffractive elements, each incident diffractive element may have circularly polarized light selectivity or linearly polarized light selectivity. In addition, each incident diffractive element may be one that diffracts light in a different polarization state. For example, in the example shown in FIG. 30, the incident diffractive element 22a may be one that diffracts linearly polarized light, and the incident diffractive element 22b may be one that diffracts circularly polarized light. Alternatively, the incident diffractive element 22a may be one that diffracts dextrorotatory circularly polarized light, and the incident diffractive element 22b may be one that diffracts levorotatory circularly polarized light.

The polarized light selectivity of each incident diffractive element may be selected according to the polarization state of the light emitted by the corresponding image display element. In addition, a layer (for example, a linearly polarizing plate or a phase difference plate) that converts the polarization state of the light emitted by the image display element may be provided between the image display element and the incident diffractive element. For example, in a case where the image display element emits linearly polarized light and the incident diffractive element has circularly polarized light selectivity, a λ/4 plate may be provided between the image display element and the incident diffractive element.

In addition, in the configuration having a plurality of image display elements, at least one image display element may be provided on the side surface of the light guide plate inclined with respect to the main surface. Similar to the example shown in FIG. 2, this side surface is a surface inclined with respect to the main surface of the light guide plate such that the incident light is incident at an angle satisfying the total reflection condition.

In addition, in the example shown in FIG. 30, it is configured such that one retroreflective element 20c is provided, but it may be configured such that two or more retroreflective elements are arranged close to each other according to the number of image display elements, and the light emitted from each image display element is reflected by each retroreflective element.

In the example shown in FIG. 30, it is configured such that a retroreflective element in which the direction of retroreflection deviates from the incident direction by several degrees is used as the retroreflective element, but the present invention is not limited thereto.

Figure 31:
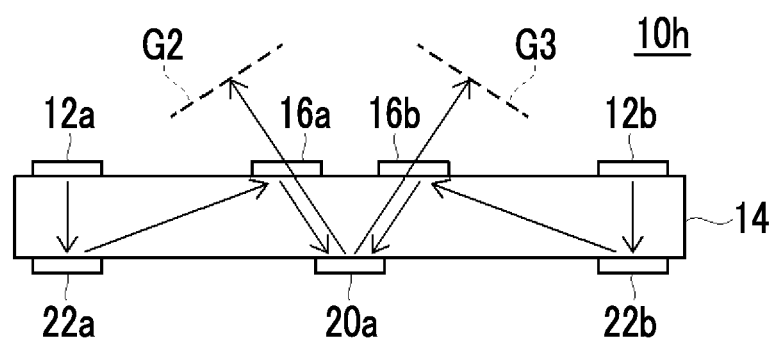
FIG. 31 is a view schematically showing another example of the image display apparatus of the present invention.

FIG. 31 schematically shows an example of another configuration of the image display apparatus according to the embodiment of the present invention.

An image display apparatus 10h shown in FIG. 31 includes an image display element 12a, an image display element 12b, a light guide plate 14, an incident diffractive element 22a, an incident diffractive element 22b, a first diffractive reflective element 16a, a first diffractive reflective element 16b, and a retroreflective element 20a. The incident diffractive element 22a, the incident diffractive element 22b, the first diffractive reflective element 16a, and the first diffractive reflective element 16b are elements that reflect the incident light while diffracting it. The retroreflective element 20a is a retroreflective element that reflects the incident light in an incident direction.

In the image display apparatus 10h, the image display element 12a is arranged at the left end part in the horizontal direction of one main surface of the light guide plate 14 in FIG. 31. In addition, the image display element 12b is arranged at the right end part in the horizontal direction of one main surface of the light guide plate 14 in FIG. 31. That is, in the image display apparatus 10h, the image display element 12a and the image display element 12b are arranged at different positions in the plane direction of the main surface of the light guide plate 14.

The incident diffractive element 22a is arranged at the left end part in the horizontal direction of the other main surface of the light guide plate 14 in FIG. 31. That is, the incident diffractive element 22a is arranged at a position overlapping the image display element 12a in the plane direction of the main surface of the light guide plate 14. In addition, the incident diffractive element 22b is arranged at the right end part in the horizontal direction of the other main surface of the light guide plate 14 in FIG. 31. That is, the incident diffractive element 22*b* is arranged at a position overlapping the image display element 12*b* in the plane direction of the main surface of the light guide plate 14.

The retroreflective element 20*a* is arranged at the center position in the horizontal direction of the other main surface of the light guide plate 14 in FIG. 31.

The first diffractive reflective element 16*a* is arranged on the left side of the center in the horizontal direction of one main surface of the light guide plate 14 in FIG. 31. In addition, the first diffractive reflective element 16*b* is arranged on the right side of the center in the horizontal direction of one main surface of the light guide plate 14 in FIG. 31. That is, the first diffractive reflective element 16*a* and the first diffractive reflective element 16*b* are arranged in the vicinity of the retroreflective element 20*a* in the plane direction of the main surface of the light guide plate 14. In addition, the first diffractive reflective element 16*a* and the first diffractive reflective element 16*b* are arranged at different positions in the plane direction of the main surface of the light guide plate 14.

In the image display apparatus 10*h* having such a configuration, in a case where the light (image light) emitted by the image display element 12*a* is incident on the light guide plate 14 from the main surface, the light travels in the light guide plate 14 and is incident on the incident diffractive element 22*a* arranged on the opposite main surface. The light incident on the incident diffractive element 22*a* is diffracted and reflected at an angle satisfying the total reflection condition. The light reflected by the incident diffractive element 22*a* is totally reflected inside the light guide plate 14 on both main surfaces (interfaces) and is then guided toward the right in the figure. The light guided in the light guide plate 14 is incident on the first diffractive reflective element 16*a*. The light incident on the first diffractive reflective element 16*a* is diffracted in the traveling direction of the light at an angle deviating from the total reflection condition in the light guide plate. The light reflected by the first diffractive reflective element 16*a* is incident on the retroreflective element 20*a* and then retroreflected. The light reflected by the retroreflective element 20*a* is incident on the first diffractive reflective element 16*a*, but is deviated from the total reflection condition, and a part of the light transmits through the first diffractive reflective element 16*a*, so that the light is emitted to the outside from the light guide plate 14. The light emitted from the light guide plate 14 by the reflection by the retroreflective element 20*a* forms an aerial image G2 on an optical path thereof. The aerial image G2 is visible in a case where the image display apparatus 10*h* is viewed from the left side in the horizontal direction of FIG. 31, and is not visible in a case where the image display apparatus 10*h* is viewed from another direction.

In addition, in a case where the light (image light) emitted by the image display element 12*b* is incident on the light guide plate 14 from the main surface, the light travels in the light guide plate 14 and is incident on the incident diffractive element 22*b* arranged on the opposite main surface. The light incident on the incident diffractive element 22*b* is diffracted and reflected at an angle satisfying the total reflection condition. The light reflected by the incident diffractive element 22*b* is totally reflected inside the light guide plate 14 on both main surfaces (interfaces) and is then guided toward the left in the figure. The light guided in the light guide plate 14 is incident on the first diffractive reflective element 16*b*. The light incident on the first diffractive reflective element 16*b* is diffracted in the traveling direction of the light at an angle deviating from the total reflection condition in the light guide plate. The light reflected by the first diffractive reflective element 16*b* is incident on the retroreflective element 20*a* and then retroreflected. The light reflected by the retroreflective element 20*a* is incident on the first diffractive reflective element 16*b*, but is deviated from the total reflection condition, and a part of the light transmits through the first diffractive reflective element 16*b*, so that the light is emitted to the outside from the light guide plate 14. The light emitted from the light guide plate 14 by the reflection by the retroreflective element 20*a* forms an aerial image G3 on an optical path thereof. The aerial image G3 is visible in a case where the image display apparatus 10*h* is viewed from the right side in the horizontal direction of FIG. 31, and is not visible in a case where the image display apparatus 10*h* is viewed from another direction.

Here, as shown in FIG. 31, since the first diffractive reflective element 16*a* and the first diffractive reflective element 16*b* are arranged at different positions in a plane direction, the light diffracted by the first diffractive reflective element 16*a* and incident on the retroreflective element 20*a* is reflected toward the direction of the first diffractive reflective element 16*a*, and the light diffracted by the first diffractive reflective element 16*b* and incident on the retroreflective element 20*a* is reflected toward the direction of the first diffractive reflective element 16*b*. Therefore, the image display apparatus 10*h* can display different aerial images in different directions.

As seen from the above, in a case where a normal retroreflective element that reflects the incident light in an incident direction is used as the retroreflective element in a case of the configuration in which a plurality of image display elements are provided and different aerial images are displayed in different directions, a plurality of diffractive reflective elements that change the angle of the light incident on the retroreflective element so as to deviate from the total reflection condition may be provided for each image display element so that the light emitted from each image display element is incident on the retroreflective element from different directions.

Figure 32:
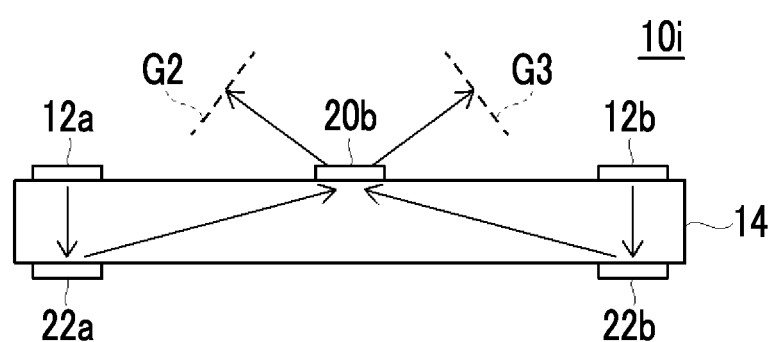
FIG. 32 is a view schematically showing another example of the image display apparatus of the present invention.

FIG. 32 schematically shows an example of another configuration of the image display apparatus according to the embodiment of the present invention.

An image display apparatus 10*i* shown in FIG. 32 includes an image display element 12*a*, an image display element 12*b*, a light guide plate 14, an incident diffractive element 22*a*, an incident diffractive element 22*b*, and a retroreflective element 20*b*. The incident diffractive element 22*a* and the incident diffractive element 22*b* are elements that diffract and reflect the incident light. The retroreflective element 20*b* is an element that retroreflects incident light in a plane direction and specularly reflects the incident light in a thickness direction.

The image display apparatus 10*i* shown in FIG. 32 has the same configuration as the image display apparatus 10*h* shown in FIG. 31, except that the retroreflective element 20*b* is provided instead of the retroreflective element 20*a*, and the first diffractive reflective element 16*a* and the first diffractive reflective element 16*b* are provided.

The retroreflective element 20*b* is arranged at the center position in the horizontal direction of one main surface of the light guide plate 14 in FIG. 32.

In the image display apparatus 10*i* having such a configuration, in a case where the light (image light) emitted by the image display element 12*a* is incident on the light guide plate 14 from the main surface, the light travels in the light guide plate 14 and is incident on the incident diffractive element 22a arranged on the opposite main surface. The light incident on the incident diffractive element 22a is diffracted and reflected at an angle satisfying the total reflection condition. The light reflected by the incident diffractive element 22a is totally reflected inside the light guide plate 14 on both main surfaces (interfaces) and is then guided toward the right in the figure. The light guided in the light guide plate 14 is incident on the retroreflective element 20b and then retroreflected. The light reflected by the retroreflective element 20b is retroreflected in a plane direction, but is specularly reflected in a thickness direction, and is therefore emitted to the outside from the light guide plate 14. The light emitted from the light guide plate 14 by the reflection by the retroreflective element 20b forms an aerial image G2 on an optical path thereof. The aerial image G2 is visible in a case where the image display apparatus 10i is viewed from the left side in the horizontal direction of FIG. 32, and is not visible in a case where the image display apparatus 10i is viewed from another direction.

In addition, in a case where the light (image light) emitted by the image display element 12b is incident on the light guide plate 14 from the main surface, the light travels in the light guide plate 14 and is incident on the incident diffractive element 22b arranged on the opposite main surface. The light incident on the incident diffractive element 22b is diffracted and reflected at an angle satisfying the total reflection condition. The light reflected by the incident diffractive element 22b is totally reflected inside the light guide plate 14 on both main surfaces (interfaces) and is then guided toward the left in the figure. The light guided in the light guide plate 14 is incident on the retroreflective element 20b and then retroreflected. The light reflected by the retroreflective element 20b is retroreflected in a plane direction, but is specularly reflected in a thickness direction, and is therefore emitted to the outside from the light guide plate 14. The light emitted from the light guide plate 14 by the reflection by the retroreflective element 20b forms an aerial image G3 on an optical path thereof. The aerial image G3 is visible in a case where the image display apparatus 10i is viewed from the right side in the horizontal direction of FIG. 32, and is not visible in a case where the image display apparatus 10i is viewed from another direction.

As seen from the above, in the image display apparatus 10i shown in FIG. 32, the image emitted by the image display element 12a and the image emitted by the image display element 12b are guided through different paths in the light guide plate 14 and are reflected by the retroreflective element. Therefore, the image display apparatus 10i can display different aerial images in different directions.

Here, in the examples shown in FIG. 30 to FIG. 32, it is configured simply such that different aerial images are displayed in different directions, but the present invention is not limited thereto.

Figure 33:
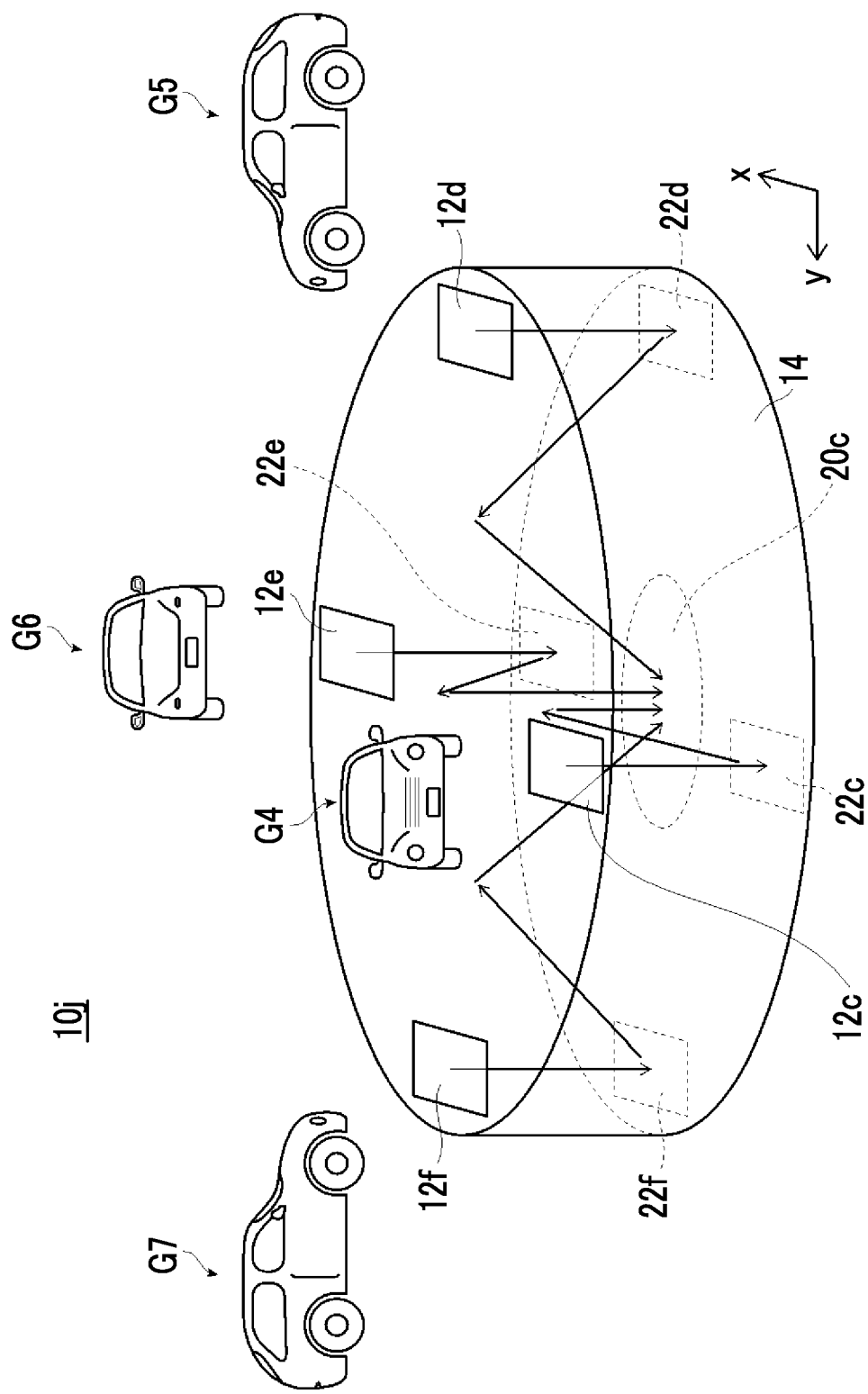
FIG. 33 is a perspective view schematically showing another example of the image display apparatus of the present invention.

FIG. 33 conceptually shows another example of the image display apparatus according to the embodiment of the present invention.

An image display apparatus 10j shown in FIG. 33 includes an image display element 12c, an image display element 12d, an image display element 12e, an image display element 12f, a light guide plate 14, an incident diffractive element 22c, an incident diffractive element 22d, an incident diffractive element 22e, an incident diffractive element 22f, and a retroreflective element 20c. The incident diffractive element 22c to the incident diffractive element 22f are elements that diffract and reflect the incident light.

The retroreflective element 20c is a retroreflective element that reflects the incident light in an incident direction, and is a retroreflective element in which the direction of retroreflection is deviated from the incident direction by several degrees.

The image display element 12c to the image display element 12f emit images of the same object viewed from different directions. As an example, in FIG. 33, the image display element 12c emits an image of a motor vehicle viewed from the front, the image display element 12d emits an image of the motor vehicle viewed from the left side, the image display element 12e emits an image of the motor vehicle viewed from the rear side, and the image display element 12f emits an image of the motor vehicle viewed from the right side.

In FIG. 33, assuming that one direction of the main surface of the light guide plate 14 is an x direction and the direction orthogonal to the x direction is a y direction, the image display element 12c is arranged at the lower end part in the x direction and the end part of the center in the y direction on one main surface of the light guide plate 14 in FIG. 33. In addition, the image display element 12d is arranged at the end part of the center in the x direction and the right end part in the y direction on one main surface of the light guide plate 14 in FIG. 33. In addition, the image display element 12e is arranged at the upper end part in the x direction and the right end part of the center in the y direction on one main surface of the light guide plate 14 in FIG. 33. In addition, the image display element 12f is arranged at the end part of the center in the x direction and the left end part in the y direction on one main surface of the light guide plate 14 in FIG. 33. That is, in the image display apparatus 10j, the incident diffractive element 22c to the incident diffractive element 22f are arranged at different positions in the plane direction of the main surface of the light guide plate 14.

The incident diffractive element 22c is arranged at the lower end part in the x direction and the end part of the center in the y direction on the other main surface of the light guide plate 14 in FIG. 33. That is, the incident diffractive element 22c is arranged at a position overlapping the image display element 12c in the plane direction of the main surface of the light guide plate 14. In addition, the incident diffractive element 22d is arranged at the end part of the center in the x direction and the right end part in the y direction on the other main surface of the light guide plate 14 in FIG. 33. That is, the incident diffractive element 22d is arranged at a position overlapping the image display element 12d in the plane direction of the main surface of the light guide plate 14. In addition, the incident diffractive element 22e is arranged at the upper end part in the x direction and the end part of the center in the y direction on the other main surface of the light guide plate 14 in FIG. 33. That is, the incident diffractive element 22e is arranged at a position overlapping the image display element 12e in the plane direction of the main surface of the light guide plate 14. In addition, the incident diffractive element 22f is arranged at the end part of the center in the x direction and the left end part in the y direction on the other main surface of the light guide plate 14 in FIG. 33. That is, the incident diffractive element 22f is arranged at a position overlapping the image display element 12f in the plane direction of the main surface of the light guide plate 14.

The retroreflective element 20c is arranged at the center in the x direction and the center in the y direction on the other main surface of the light guide plate 14 in FIG. 33.

In the image display apparatus 10j having such a configuration, in a case where the light (image light) emitted by the image display element 12c is incident on the light guide plate 14 from the main surface, the light travels in the light guide plate 14 and is incident on the incident diffractive element 22c arranged on the opposite main surface. The light incident on the incident diffractive element 22c is diffracted and reflected at an angle satisfying the total reflection condition. The light reflected by the incident diffractive element 22c is totally reflected inside the light guide plate 14 on both main surfaces (interfaces) and is then guided toward the upper side in the x direction. The light guided in the light guide plate 14 is incident on the retroreflective element 20c and then retroreflected. At that time, the retroreflective element 20c retroreflects the incident light in a direction deviated by several degrees with respect to the incident direction. The light reflected by the retroreflective element 20c reaches the main surface of the light guide plate 14. At that time, the light is emitted to the outside from the light guide plate 14 without being totally reflected on the main surface of the light guide plate 14 by shifting the reflection direction (angle) by the retroreflective element 20c such that the incidence angle of the light with respect to the main surface of the light guide plate 14 deviates from the total reflection condition. The light emitted from the light guide plate 14 by the reflection by the retroreflective element 20c forms an aerial image G4 on an optical path thereof. Therefore, in a case where the image display apparatus 10j is viewed from the lower side in the x direction in FIG. 33, the image of the front of the motor vehicle is visible as an aerial image.

The light emitted by the image display element 12d to the image display element 12f is also diffracted by the corresponding incident diffractive elements, guided in the light guide plate 14, and incident on the retroreflective element 20c to be retroreflected. The light emitted from the light guide plate 14 by the reflection by the retroreflective element 20c forms (displays) an aerial image (G5 to G7) on an optical path thereof.

Therefore, in a case where the image display apparatus 10j is viewed from the right side in the y direction in FIG. 33, the image of the motor vehicle viewed from the right side is visible as an aerial image. In addition, in a case where the image display apparatus 10j is viewed from the upper side in the x direction, the image of the motor vehicle viewed from the rear side is visible as an aerial image. In addition, in a case where the image display apparatus 10j is viewed from the left side in the y direction, the image of the motor vehicle viewed from the left side is visible as an aerial image. As a result, the image is visible so as to change the direction of the displayed aerial image according to the viewing direction of the image display apparatus 10j, and therefore can be visible as a three-dimensional aerial image.

As seen from the above, in a case of the configuration for displaying a three-dimensional aerial image in which the direction of the displayed aerial image changes according to the viewing direction of the image display apparatus 10j, the image to be emitted by the image display element may be appropriately selected according to the arrangement of the image display element.

The image display apparatus 10j shown in FIG. 33 has a configuration having four image display elements, but as the number of image display elements increases, an aerial image at an appropriate angle can be displayed in a case of being viewed from various directions, and the image can be seen continuously and therefore can be visible as a more three-dimensional aerial image.

Hereinafter, each constituent element of the image display apparatus according to the embodiment of the present invention will be described.

[Image Display Element]

The image display element emits an image (a still image or a moving image) projected in the air.

The image display element is not limited, and for example, various known displays used in an image display apparatus can be used.

Examples of the image display element include a liquid crystal display (including liquid crystal on silicon (LCOS) or the like), an organic electroluminescent display, digital light processing (DLP) display, a micro-electro-mechanical systems (MEMS) display, and a micro LED display.

The image display element may be one that displays a monochrome image, one that displays a two-color image, or one that displays a color image.

In addition, the light emitted by the image display element may be unpolarized light, linearly polarized light, or circularly polarized light. In addition, the image display apparatus may have an optical member that converts the polarization state of the light emitted by the image display element.

[Light Guide Plate]

The light guide plate internally guides the incident light.

The light guide plate is not particularly limited, and a conventionally known light guide plate used in an image display apparatus or the like can be used.

As described above, in a case where the image display element is arranged facing the side surface, the side surface (incident surface 14a) of the light guide plate is provided so as to be inclined with respect to the main surface such that the incident light is incident at an angle satisfying the total reflection condition. In this case, the inclined angle of the incident surface 14a with respect to the main surface may be appropriately set according to the refractive index of the light guide plate or the like, and is preferably 40° to 70°, more preferably 42° to 65°, and still more preferably 45° to 60°.

The thickness of the light guide plate is not particularly limited, and is preferably 1 mm to 500 mm, more preferably 10 mm to 100 mm, and still more preferably 30 mm to 50 mm from the viewpoint of reducing the volume of the entire image display apparatus.

In addition, the size of the main surface of the light guide plate is not particularly limited, and may be appropriately set according to the size of the aerial image displayed by the image display apparatus, the size of the display surface of the image display element, or the like.

[Retroreflective Element]

The retroreflective element is an element that retroreflects the incident light in an incident direction.

The retroreflective element is not particularly limited, and a conventionally known retroreflective element can be used.

Examples of the retroreflective element 20a of the image display apparatus shown in FIG. 1 or the like that retroreflects the incident light in an incident direction include an element using a transparent sphere (bead) and an element using a corner cube structure.

Figure 10:
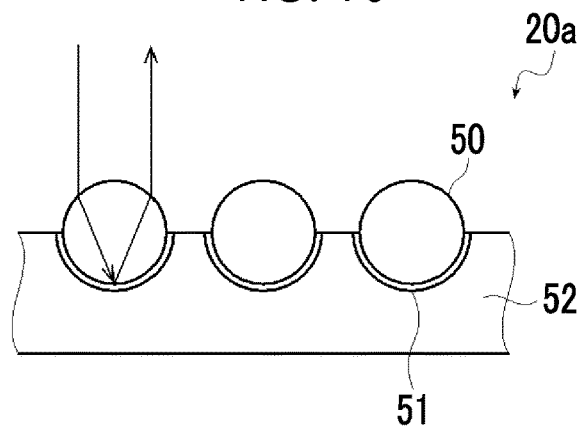
FIG. 10 is a cross-sectional view schematically showing an example of a retroreflective element.

FIG. 10 is a cross-sectional view schematically showing an example of the retroreflective element 20a.

The retroreflective element 20a shown in FIG. 10 has beads 50 consisting of glass or the like, a reflective film 51 which is a film of a metal such as aluminum, and a resin layer 52. As shown in FIG. 10, a part of each of a plurality of beads 50 is embedded in the resin layer 52, and the reflective film 51 is formed between the beads 50 and the resin layer 52.

In a case where light is incident on the retroreflective element 20a shown in FIG. 10, the light is refracted on the surface of the beads 50 in a case of being incident on the beads 50 and then reflected by the reflective film 51. The reflected light is emitted from the beads 50 as reflected light. Upon emission, the light is refracted on the surface of the beads 50 and returns to an incident direction in parallel or substantially parallel to the incident light.

Figure 11:
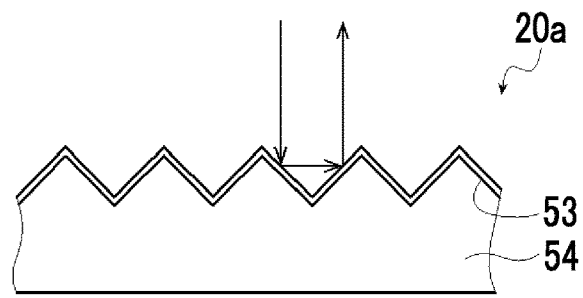
FIG. 11 is a cross-sectional view schematically showing another example of the retroreflective element.

FIG. 11 is a cross-sectional view schematically showing another example of the retroreflective element 20a.

The retroreflective element 20a shown in FIG. 11 has a substrate 54 and a reflective film 53. The surface of the substrate 54 has a corner cube structure, and the reflective film 53 is provided along the concave-convex surface of the corner cube structure. As a result, the reflective film 53 constitutes the reflecting surface.

With regard to the light incident on the retroreflective element 20a shown in FIG. 11, the corner cube structure has a configuration in which three surfaces are combined at right angles, and retroreflects the incident light in an incident direction by reflecting the incident light multiple times on the three surfaces.

The retroreflective element 20a is not limited to the configuration of the illustrated example, and various known retroreflective element configurations can be used. For example, a so-called dihedral corner reflector array type retroreflective element can also be used as the retroreflective element. FIG. 2 of JP6270898B can be referred to as a structural example of the dihedral corner reflector array type retroreflective element.

Here, by making the retroreflective element 20a a half mirror (semi-transparent), the rear surface of the aerial image displayed by the image display apparatus 10 becomes semi-transparent, and the background can also be visible, so that an aerial image with a more floating feeling can be displayed.

Examples of the configuration in which the retroreflective element 20a is semi-transparent include a configuration in which the reflective film is a thin metal vapor-deposited film, a configuration in which a cholesteric liquid crystal layer is used as the reflective film, and a configuration in which a dielectric multi-layer film is used as the reflective film.

The cholesteric liquid crystal layer has a configuration in which a liquid crystal compound is cholesterically aligned, and has circularly polarized light selectivity that reflects circularly polarized light in one turning direction and transmits circularly polarized light in the other turning direction. The cholesteric liquid crystal layer can be said to be semi-transparent (half mirror) due to the circularly polarized light selectivity.

The dielectric multi-layer film has a configuration in which a transparent film having a high refractive index and a transparent film having a low refractive index are alternately laminated, and is semi-transparent, which reflects a part of light and transmits the rest of the light due to slight reflection of light at the boundary of the film.

In addition, the linearly polarized light selectivity can be imparted by embossing the dielectric multi-layer film.

A reflector array or the like described in JP2018-040962A can be used as the retroreflective element 20b of the image display apparatus shown in FIG. 6 or the like that retroreflects the incident light in a plane direction.

Figure 12:
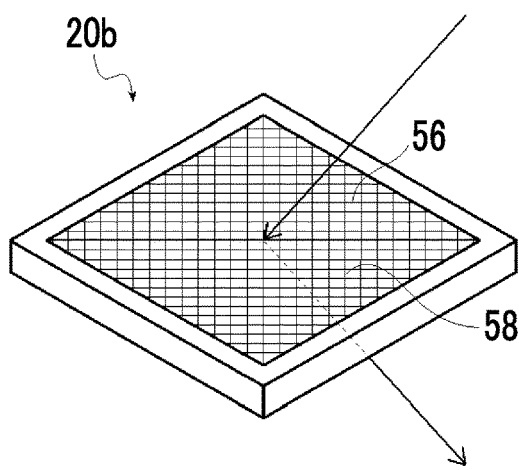
FIG. 12 is a perspective view schematically showing another example of the retroreflective element.
Figure 13:
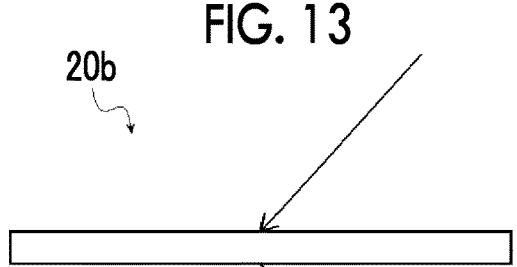
FIG. 13 is a side view of the retroreflective element of FIG. 12.
Figure 14:
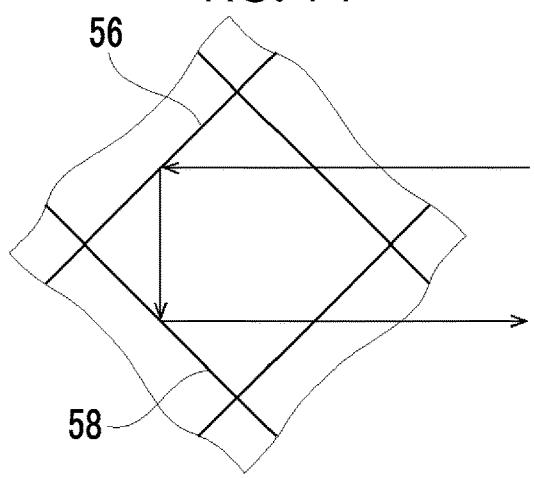
FIG. 14 is an enlarged plan view of a part of the retroreflective element of FIG. 12.

FIG. 12 is a perspective view schematically showing an example of the retroreflective element 20b. FIG. 13 is a side view of the retroreflective element 20b shown in FIG. 12. FIG. 14 is an enlarged plan view of a part of the retroreflective element 20b shown in FIG. 12.

The retroreflective element 20b shown in FIG. 12 to FIG. 14 has a configuration in which a plurality of first reflective plates 56 arranged in parallel with each other and a plurality of second reflective plates 58 arranged in parallel with each other are arranged vertically with each other.

In a case where light is incident on such a retroreflective element 20b, the light is specularly reflected in a thickness direction as shown in FIG. 13. On the other hand, in a plane direction, as shown in FIG. 14, light is reflected twice by the first reflective plate 56 and the second reflective plate 58, so that the light is reflected in an incident direction in the plane direction. Therefore, the retroreflective element 20b retroreflects the incident light in a plane direction.

Here, in the retroreflective element 20b, the reflecting surface of the reflective plate may be a half mirror (semi-transparent) as a thin metal vapor-deposited film, a cholesteric liquid crystal layer, or a dielectric multi-layer film, as described above. As a result, the rear surface of the aerial image displayed by the image display apparatus 10 becomes semi-transparent, and the background can also be visible, so that an aerial image with a more floating feeling can be displayed.

The retroreflective element 20c of the image display apparatus shown in FIG. 9 that retroreflects the incident light in a direction deviated by several degrees may be, for example, a configuration in which the inclination of one surface is changed in the above-mentioned corner cube type retroreflective element. In the corner cube type retroreflective element, the direction of retroreflection can be changed by changing the inclination of one surface.

[Diffractive Reflective Element]

As the first diffractive reflective element and the second diffractive reflective element, conventionally known diffractive elements can be appropriately used as long as those diffractive elements are reflective type diffractive elements.

Examples of the reflective type diffractive element include a reflective type liquid crystal diffractive element and a linear Fresnel lens type diffractive element. In addition, a surface relief type diffractive element which will be described later can also be used as the reflective type diffractive element by appropriately designing a concave-convex structure.

(Linear Fresnel Lens Type Diffractive Element)

Figure 15:
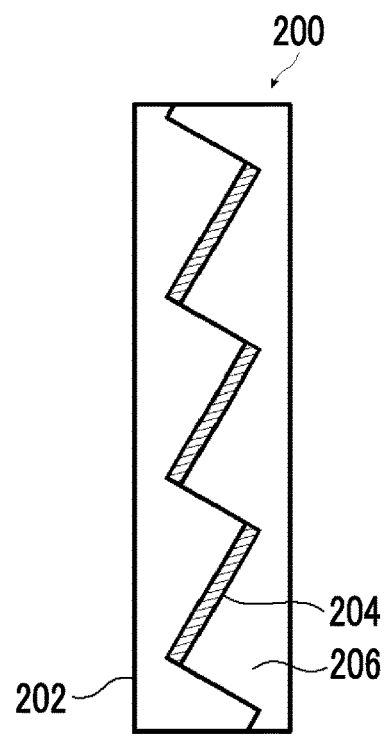
FIG. 15 is a cross-sectional view schematically showing an example of a diffractive reflective element.

FIG. 15 is a view schematically showing an example of the linear Fresnel lens type diffractive element that can be used as the first diffractive reflective element and the second diffractive reflective element.

A diffractive element 200 shown in FIG. 15 has a substrate 202, a reflector 204, and a resin layer 206.

The substrate 202 is a transparent member having an concave-convex surface in the shape of a linear Fresnel lens. The material for the substrate 202 is not particularly limited, and is preferably a material having transparency. Examples of the transparent substrate include a resin such as acrylic resin, and glass.

The surface of the substrate 202 (the surface opposite to the reflector 204) is flat.

The reflector 204 is a member having light reflectivity for at least a part of light. The reflector 204 is arranged on the inclined surface of the concave-convex surface of the substrate 202.

The reflector 204 preferably has transparency to light having a wavelength other than the wavelength of the reflected light.

A dielectric multi-layer film, a metal thin film, or a cholesteric liquid crystal layer that reflects dextrorotatory or levorotatory circularly polarized light having a predetermined wavelength and transmits light in another wavelength range and the other circularly polarized light, that is, a cholesteric liquid crystal layer having wavelength-selective reflectivity and circularly polarized light-selective reflectivity is suitably used as the reflector 204.

The resin layer 206 is a transparent layer that is on the side of the reflector 204 opposite to the substrate 202 side and covers the surface of the reflector 204 and the surface of the substrate 202. The material for the resin layer 206 is not particularly limited as long as it has transparency, and examples thereof include resins such as acrylic resin.

The surface of the resin layer 206 (the surface opposite to the reflector 204) is flat.

In the diffractive element 200 having such a configuration, the reflector 204 is inclined with respect to the main surface of the diffractive element 200, and therefore the incident light can be reflected on the main surface of the diffractive element 200 in a direction different from specular reflection.

(Reflective Type Liquid Crystal Diffractive Element)

An example of the reflective type liquid crystal diffractive element will be described with reference to FIG. 16 and FIG. 17.

Figure 16:
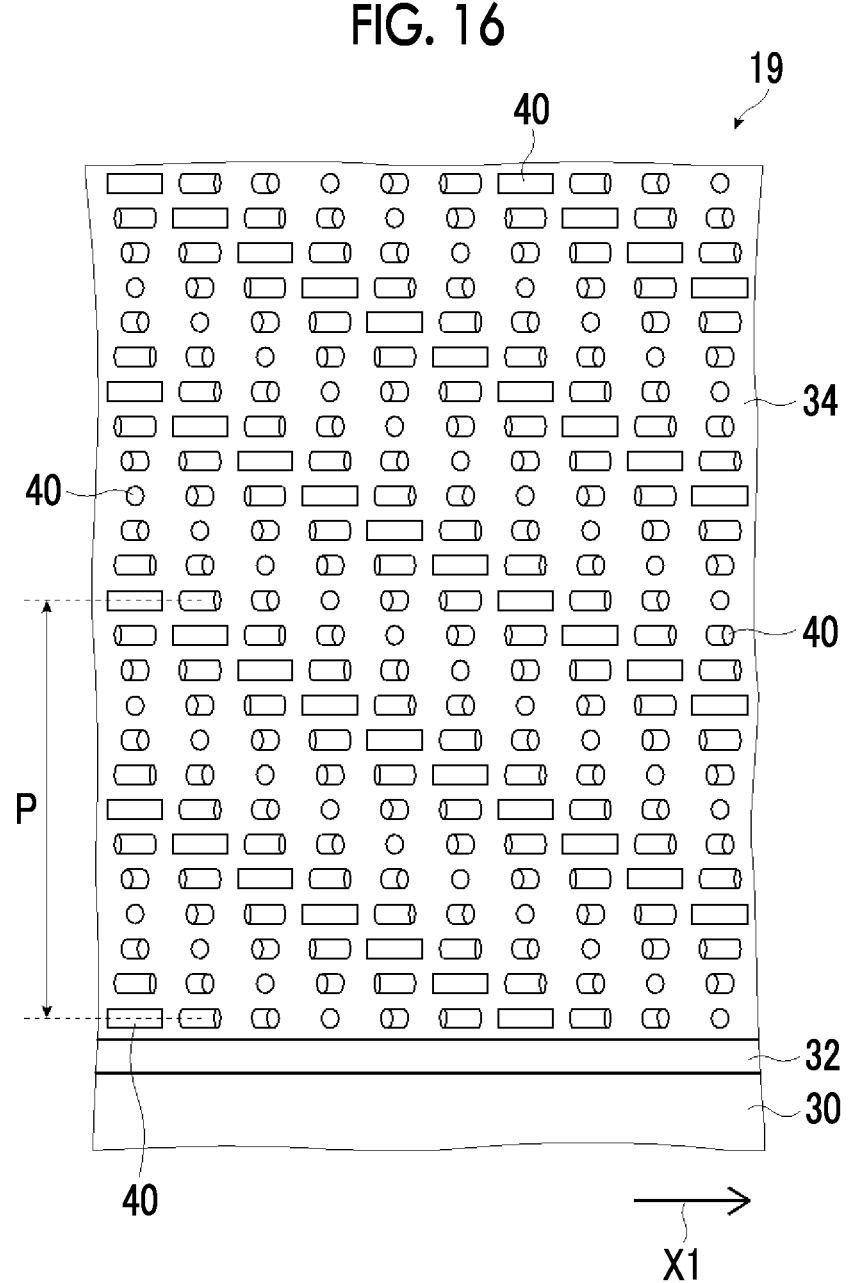
FIG. 16 is a conceptual diagram for explaining a reflective type liquid crystal diffractive element.

FIG. 16 is a view schematically showing an example of the reflective type liquid crystal diffractive element. FIG. 17 is a plan view of FIG. 16.

Figure 17:
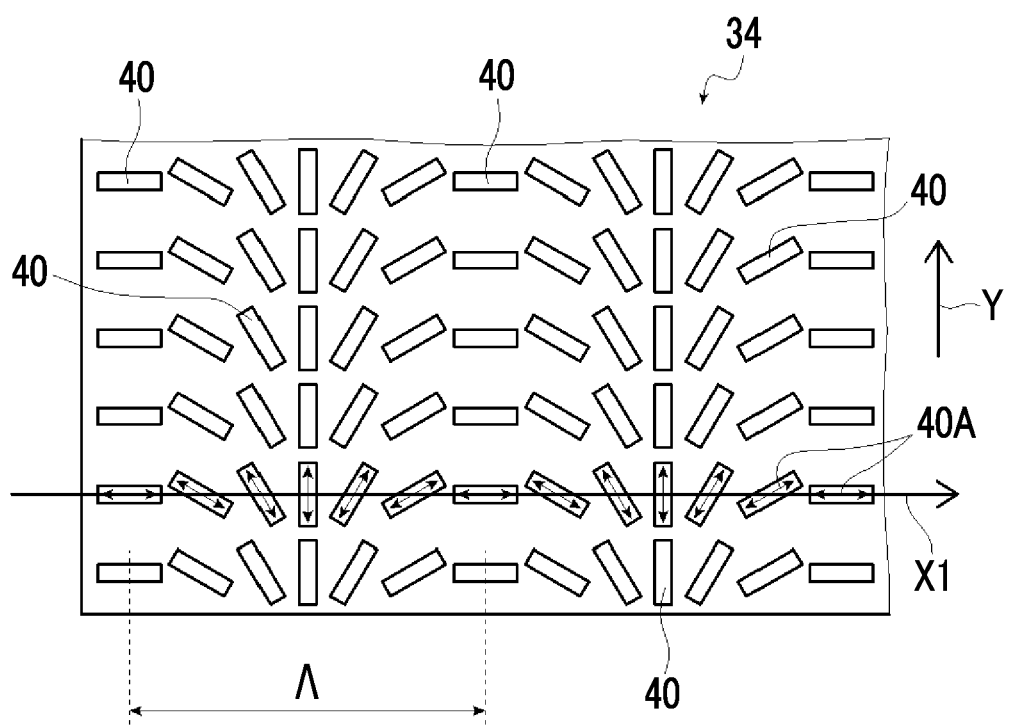
FIG. 17 is a plan view of the reflective type liquid crystal diffractive element shown in FIG. 16.

A reflective type liquid crystal diffractive element 19 shown in FIG. 16 and FIG. 17 is a patterned cholesteric liquid crystal layer in which a cholesteric liquid crystalline phase is fixed and which has a liquid crystal alignment pattern in which the direction of an optical axis derived from a liquid crystal compound changes while continuously rotating along at least one in-plane direction.

In the example shown in FIG. 16, the reflective type liquid crystal diffractive element 19 has a support 30, an alignment film 32, and a patterned cholesteric liquid crystal layer 34.

The reflective type liquid crystal diffractive element 19 of the example shown in FIG. 16 has the support 30, the alignment film 32, and the patterned cholesteric liquid crystal layer 34, but the present invention is not limited thereto. The reflective type liquid crystal diffractive element 19 may have, for example, only the alignment film 32 and the patterned cholesteric liquid crystal layer 34 from which the support 30 has been peeled off, after being bonded to the light guide plate 14. Alternatively, the reflective type liquid crystal diffractive element 19 may have, for example, only the patterned cholesteric liquid crystal layer 34 from which the support 30 and the alignment film 32 have been peeled off, after being bonded to the light guide plate 14.

<Support>

The support 30 supports the alignment film 32 and the patterned cholesteric liquid crystal layer 34.

Various sheet-like materials (a film and a plate-like material) can be used as the support 30, as long as those materials can support the alignment film 32 and the patterned cholesteric liquid crystal layer 34.

The support 30 preferably has a transmittance of 50% or more, more preferably 70% or more, and still more preferably 85% or more with respect to the corresponding light.

The thickness of the support 30 is not limited, and the thickness capable of holding the alignment film 32 and the patterned cholesteric liquid crystal layer 34 may be appropriately set according to the application of the reflective type liquid crystal diffractive element 19, the forming material of the support 30, and the like.

The thickness of the support 30 is preferably 1 to 2,000 µm, more preferably 3 to 500 µm, and still more preferably 5 to 250 µm.

The support 30 may be single-layered or multi-layered.

The support 30 in a case of being single-layered may be, for example, a support 30 consisting of glass, triacetyl cellulose (TAC), polyethylene terephthalate (PET), polycarbonate, polyvinyl chloride, acrylic, polyolefin, or the like. The support 30 in a case of being multi-layered may be, for example, one including any of the above-mentioned single-layered supports as a substrate and another layer provided on the surface of the substrate.

<Alignment Film>

In the reflective type liquid crystal diffractive element 19, the alignment film 32 is formed on the surface of the support 30.

The alignment film 32 is an alignment film for aligning a liquid crystal compound 40 in a predetermined liquid crystal alignment pattern in a case of forming the patterned cholesteric liquid crystal layer 34.

In the present invention, as will be described later, the patterned cholesteric liquid crystal layer 34 has a liquid crystal alignment pattern in which the direction of an optical axis 40A (see FIG. 17) derived from the liquid crystal compound 40 changes while continuously rotating along one in-plane direction. Therefore, the alignment film 32 is formed such that the patterned cholesteric liquid crystal layer 34 can form such a liquid crystal alignment pattern.

In the following description, "the direction of the optical axis 40A rotates" is also simply referred to as "the optical axis 40A rotates".

Various known alignment films can be used as the alignment film 32.

Examples of the alignment film include a rubbing-treated film consisting of an organic compound such as a polymer, an oblique vapor-deposited film of an inorganic compound, a film having microgrooves, and a film in which a Langmuir-Blodgett (LB) film obtained by the Langmuir-Blodgett method of an organic compound such as ω-tricosanoic acid, dioctadecylmethylammonium chloride, or methyl stearate is accumulated.

The rubbing-treated alignment film 32 can be formed by rubbing the surface of the polymer layer with paper or cloth several times in a certain direction.

Preferred examples of the material used for the alignment film 32 include polyimides, polyvinyl alcohols, the polymers having a polymerizable group described in JP1997-152509A (JP-H09-152509A), and the materials used for forming the alignment film 32 or the like described in JP2005-97377A, JP2005-99228A, and JP2005-128503A.

In the reflective type liquid crystal diffractive element 19, a so-called photo-alignment film, in which a material having photo-aligning properties is irradiated with polarized light or non-polarized light to form an alignment film 32, is suitably used as the alignment film 32. That is, in the reflective type liquid crystal diffractive element 19, a photo-alignment film formed by applying a photo-alignment material on the support 30 is suitably used as the alignment film 32.

The polarized light irradiation can be carried out from a vertical direction or an oblique direction with respect to the photo-alignment film, and the non-polarized light irradiation can be carried out from an oblique direction with respect to the photo-alignment film.

Preferred examples of the photo-alignment material used for the alignment film that can be used in the present invention include the azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo-alignment unit described in JP2002-265541A and JP2002-317013A; photocrosslinkable silane derivatives described in JP4205195B and JP4205198B; photocrosslinkable polyimides, photocrosslinkable polyamides, and photocrosslinkable polyesters described in JP2003-520878A, JP2004-529220A, and JP4162850B; and photodimerizable compounds, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, and JP2014-12823A.

Among those compounds, azo compounds, photocrosslinkable polyimides, photocrosslinkable polyamides, photocrosslinkable polyesters, cinnamate compounds, and chalcone compounds are suitably used.

The thickness of the alignment film 32 is not limited, and the thickness at which the required alignment function can be obtained may be appropriately set according to the material for forming the alignment film 32.

The thickness of the alignment film 32 is preferably 0.01 to 5 μm and more preferably 0.05 to 2 μm.

The method for forming the alignment film 32 is not limited, and various known methods depending on the material for forming the alignment film 32 can be used. A method of applying the alignment film 32 onto the surface of the support 30 and drying the alignment film 32 and then exposing the alignment film 32 to laser light to form an alignment pattern is exemplified as an example.

Figure 18:
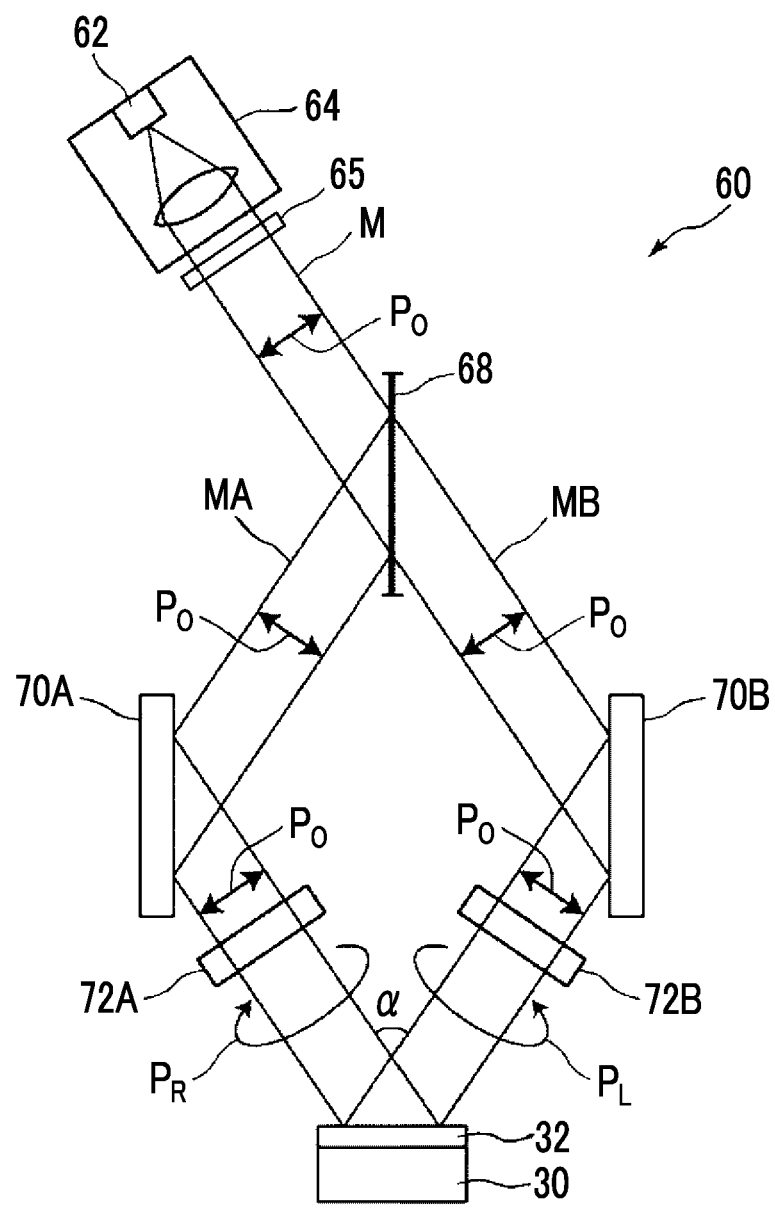
FIG. 18 is a conceptual diagram of an example of an exposure device that exposes an alignment film of the liquid crystal diffractive element shown in FIG. 16 to light.

FIG. 18 conceptually shows an example of an exposure device that exposes the alignment film 32 to light to form an alignment pattern.

An exposure device 60 shown in FIG. 18 includes a light source 64 equipped with a laser 62, a λ/2 plate 65 that changes the polarization direction of the laser light M emitted by the laser 62, a polarizing beam splitter 68 that separates the laser light M emitted by the laser 62 into two rays MA and MB, mirrors 70A and 70B arranged on optical paths of the two separated rays MA and MB, respectively, and λ/4 plates 72A and 72B.

The light source 64 emits linearly polarized light $P_0$. The λ/4 plate 72A converts the linearly polarized light $P_0$ (ray MA) into dextrorotatory circularly polarized light $P_R$, and the λ/4 plate 72B converts the linearly polarized light $P_0$ (ray MB) into levorotatory circularly polarized light $P_L$.

The support 30 having the alignment film 32 before the alignment pattern is formed is arranged in the exposed portion, and the two ray MA and ray MB are crossed and interfered with each other on the alignment film 32, and the alignment film 32 is irradiated with the interfered light for exposure to light.

Due to the interference at this time, the polarization state of the light applied to the alignment film 32 periodically changes in the form of interference fringes. As a result, an alignment film having an alignment pattern in which the alignment state changes periodically (hereinafter, also referred to as a patterned alignment film) can be obtained.

In the exposure device 60, the period of the alignment pattern can be adjusted by changing an intersecting angle α of the two rays MA and MB. That is, in the exposure device 60, in the alignment pattern in which the optical axis 40A derived from the liquid crystal compound 40 continuously rotates along one direction, the length of one period in which the optical axis 40A rotates 180° in one direction in which the optical axis 40A rotates can be adjusted by adjusting the intersecting angle α.

It is possible to form a patterned cholesteric liquid crystal layer 34 having a liquid crystal alignment pattern in which the optical axis 40A derived from the liquid crystal compound 40 rotates continuously along one direction, as will be described later, by forming a cholesteric liquid crystal layer on the alignment film 32 having such an alignment pattern in which the alignment state changes periodically.

In addition, the rotation direction of the optical axis 40A can be reversed by rotating each of the optical axes of the λ/4 plates 72A and 72B by 90°.

As described above, the patterned alignment film has an alignment pattern that aligns the liquid crystal compound so as to be a liquid crystal alignment pattern in which the direction of the optical axis of the liquid crystal compound in the patterned cholesteric liquid crystal layer formed on the patterned alignment film changes while continuously rotating along at least one in-plane direction. In a case where the patterned alignment film has an axis along the direction in which the liquid crystal compound is aligned as the alignment axis, it can be said that the patterned alignment film has an alignment pattern in which the direction of the alignment axis changes while continuously rotating along at least one in-plane direction. The alignment axis of the patterned alignment film can be detected by measuring the absorption anisotropy. For example, in a case where the patterned alignment film is irradiated with linearly polarized light while rotating the film and the amount of light transmitted through the patterned alignment film is measured, it is observed that the direction in which the amount of light is maximum or minimum gradually changes along one in-plane direction.

In the present invention, the alignment film 32 is provided as a preferred aspect and is not an essential configuration requirement.

For example, by forming an alignment pattern on the support 30 by a method of subjecting the support 30 to a rubbing treatment, a method of processing the support 30 with a laser light, or the like, it is also possible to have a configuration in which the patterned cholesteric liquid crystal layer has a liquid crystal alignment pattern in which the direction of the optical axis 40A derived from the liquid crystal compound 40 changes while continuously rotating along at least one in-plane direction. That is, in the present invention, the support 30 may act as an alignment film.

<Patterned Cholesteric Liquid Crystal Layer>

In the reflective type liquid crystal diffractive element 19, the patterned cholesteric liquid crystal layer 34 is formed on the surface of the alignment film 32.

As described above, the patterned cholesteric liquid crystal layer is a cholesteric liquid crystal layer in which a cholesteric liquid crystalline phase is fixed and is a cholesteric liquid crystal layer having a liquid crystal alignment pattern in which the direction of an optical axis derived from a liquid crystal compound changes while continuously rotating along at least one in-plane direction.

As conceptually shown in FIG. 16, similar to a normal cholesteric liquid crystal layer in which a cholesteric liquid crystalline phase is fixed, the patterned cholesteric liquid crystal layer 34 has a helical structure in which the liquid crystal compounds 40 are helically turned and stacked, and has a structure in which the liquid crystal compounds 40 helically turning are laminated at a plurality of pitches, with the configuration in which the liquid crystal compounds 40 are helically rotated once (rotated by 360°) and stacked as one helical pitch.

As is well known, the cholesteric liquid crystal layer in which a cholesteric liquid crystalline phase is fixed has wavelength-selective reflectivity.

As will be described in detail later, the selective reflection wavelength range of the cholesteric liquid crystal layer depends on the length of the one helical pitch in a thickness direction (pitch P shown in FIG. 16).

Therefore, in a case of the configuration in which the liquid crystal diffractive element is provided with wavelength selectivity and light having a different wavelength is diffracted for each diffractive element, the helical pitch P of the patterned cholesteric liquid crystal layer may be adjusted for each liquid crystal diffractive element to appropriately set the selective reflection wavelength range of the cholesteric liquid crystal layer.

<<Cholesteric Liquid Crystalline Phase>>

The cholesteric liquid crystalline phase is known to exhibit selective reflectivity at a specific wavelength.

In a general cholesteric liquid crystalline phase, the central wavelength of selective reflection (selective reflection center wavelength) $\lambda$ depends on the helical pitch P in the cholesteric liquid crystalline phase, which draws the relationship of $\lambda = n \times P$ between the average refractive index n of the cholesteric liquid crystalline phase and $\lambda$. Therefore, the selective reflection center wavelength can be adjusted by adjusting the helical pitch.

The longer the pitch P, the longer the selective reflection center wavelength of the cholesteric liquid crystalline phase.

As described above, the helical pitch P is one pitch of the helical structure (helical period) of the cholesteric liquid crystalline phase, in other words, one helical turn in terms of the number of helical turns, that is, the length in a helical axis direction in which the director of the liquid crystal compound constituting the cholesteric liquid crystalline phase (in a major axis direction in a case of a rod-like liquid crystal) rotates 360°.

The helical pitch of the cholesteric liquid crystalline phase depends on the type of the chiral agent used together with the liquid crystal compound and the concentration of the chiral agent added in a case of forming the cholesteric liquid crystal layer. Therefore, a desired helical pitch can be obtained by adjusting these factors.

The pitch adjustment is described in detail in Fujifilm Research Report No. 50 (2005), pp. 60 to 63. As a method for measuring helical sense and pitch, the methods described in "Easy Steps in Liquid Crystal Chemistry Experiment" p 46, edited by The Japanese Liquid Crystal Society, Sigma Publishing Company, published in 2007, and "Liquid Crystal Handbook" p 196, Editorial Committee of Liquid Crystal Handbook, Maruzen Co., Ltd. can be used.

The cholesteric liquid crystalline phase exhibits selective reflectivity to either levorotatory or dextrorotatory circularly polarized light at a specific wavelength. Whether the reflected light is dextrorotatory circularly polarized light or levorotatory circularly polarized light depends on the twisted direction (sense) of the helix of the cholesteric liquid crystalline phase. The selective reflection of circularly polarized light by the cholesteric liquid crystalline phase reflects the dextrorotatory circularly polarized light in a case where the twisted direction of the helix of the cholesteric liquid crystal layer is right-handed, and reflects the levorotatory circularly polarized light in a case where the twisted direction of the helix is left-handed.

The turning direction of the cholesteric liquid crystalline phase can be adjusted by the type of the liquid crystal compound forming the cholesteric liquid crystal layer and/or the type of the chiral agent added.

In addition, the half-width $\Delta\lambda$ (nm) of the selective reflection wavelength range (circularly polarized light reflection wavelength range) exhibiting selective reflection depends on $\Delta n$ of the cholesteric liquid crystalline phase and the helical pitch P, which draws the relationship of $\Delta\lambda = \Delta n \times P$. Therefore, the width of the selective reflection wavelength range can be controlled by adjusting $\Delta n$. The $\Delta n$ can be adjusted by the type of the liquid crystal compound forming the cholesteric liquid crystal layer, the mixing ratio thereof, and the temperature at the time of fixing the alignment.

The half-width of the reflection wavelength range is adjusted according to the application of the diffractive element, and may be, for example, 10 to 500 nm, preferably 20 to 300 nm, and more preferably 30 to 100 nm.

<<Method for Forming Patterned Cholesteric Liquid Crystal Layer>>

The patterned cholesteric liquid crystal layer can be formed by fixing a cholesteric liquid crystalline phase in a layered manner.

The structure in which the cholesteric liquid crystalline phase is fixed may be any structure as long as the alignment of the liquid crystal compound which is the cholesteric liquid crystalline phase is maintained. Typically, it is preferably a structure in which a polymerizable liquid crystal compound is brought into an alignment state of a cholesteric liquid crystalline phase, and then polymerized and cured by irradiation with ultraviolet rays, heating, or the like to form a non-fluid layer, and at the same time, the polymerized and cured liquid crystal compound is changed into a state in which the alignment morphology is not changed by an external field or an external force.

In the structure in which the cholesteric liquid crystalline phase is fixed, it is sufficient that the optical properties of the cholesteric liquid crystalline phase are maintained, and the liquid crystal compound 40 does not have to exhibit liquid crystallinity in the patterned cholesteric liquid crystal layer. For example, the polymerizable liquid crystal compound may have a high molecular weight due to a curing reaction and lose its liquid crystallinity.

A liquid crystal composition containing a liquid crystal compound can be mentioned as an example of the material used for forming the patterned cholesteric liquid crystal layer in which the cholesteric liquid crystalline phase is fixed. The liquid crystal compound is preferably a polymerizable liquid crystal compound.

In addition, the liquid crystal composition used for forming the patterned cholesteric liquid crystal layer may further contain a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound forming the cholesteric liquid crystalline phase include a rod-like nematic liquid crystal compound. Azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, alkenylcyclohexylbenzonitriles, and the like are preferably used as the rod-like nematic liquid crystal compound. Not only a low molecular weight liquid crystal compound but also a polymer liquid crystal compound can be used.

The polymerizable liquid crystal compound is obtained by introducing a polymerizable group into a liquid crystal compound. Examples of the polymerizable group include an unsaturated polymerizable group, an epoxy group, and an aziridinyl group, among which an unsaturated polymerizable group is preferable and an ethylenically unsaturated polymerizable group is more preferable. The polymerizable group can be introduced into the molecule of the liquid crystal compound by various methods. The number of polymerizable groups contained in the polymerizable liquid crystal compound is preferably 1 to 6, and more preferably 1 to 3.

Examples of the polymerizable liquid crystal compound include the compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081AA (JP-H11-80081A), JP2001-328973A, and the like. Two or more polymerizable liquid crystal compounds may be used in combination. In a case where two or more polymerizable liquid crystal compounds are used in combination, the alignment temperature can be lowered.

In addition, a cyclic organopolysiloxane compound having a cholesteric phase as disclosed in JP1982-165480A (JP-S57-165480A) can be used as the polymerizable liquid crystal compound other than the above-mentioned compounds. Further, a polymer having a mesogen group exhibiting a liquid crystallinity introduced into a main chain, a side chain, or both the main chain and the side chain, a polymer cholesteric liquid crystal having a cholesteryl group introduced into a side chain, a liquid crystalline polymer as disclosed in JP1997-133810A (JP-H09-133810A), a liquid crystalline polymer as disclosed in JP1999-293252A (JP-H11-293252A), and the like can be used as the above-mentioned polymer liquid crystal compound.

—Disk-Like Liquid Crystal Compound—

For example, disk-like liquid crystal compounds described in JP2007-108732A and JP2010-244038A can be preferably used as the disk-like liquid crystal compound.

In addition, the amount of the polymerizable liquid crystal compound added to the liquid crystal composition is preferably 75% to 99.9% by mass, more preferably 80% to 99%, and still more preferably 85% to 90% by mass with respect to the solid content mass (mass excluding a solvent) of the liquid crystal composition.

—Surfactant—

The liquid crystal composition used for forming the patterned cholesteric liquid crystal layer may contain a surfactant.

The surfactant is preferably a compound capable of functioning as an alignment control agent that contributes to the alignment of the cholesteric liquid crystalline phase stably or rapidly. Examples of the surfactant include a silicone-based surfactant and a fluorine-based surfactant, among which a fluorine-based surfactant is preferably exemplified.

Specific examples of the surfactant include the compounds described in paragraphs [0082] to [0090] of JP2014-119605A, the compounds described in paragraphs [0031] to [0034] of JP2012-203237A, the compounds exemplified in paragraphs [0092] and [0093] of JP2005-99248A, the compounds exemplified in paragraphs [0076] to [0078] and paragraphs [0082] to [0085] of JP2002-129162A, the compounds exemplified in the above, and the fluorinated (meth) acrylate-based polymers described in paragraphs [0018] to [0043] of JP2007-272185A.

The surfactants may be used alone or in combination of two or more thereof.

The compounds described in paragraphs [0082] to [0090] of JP2014-119605A are preferable as the fluorine-based surfactant.

The amount of the surfactant added to the liquid crystal composition is preferably 0.01% to 10% by mass, more preferably 0.01% to 5% by mass, and still more preferably 0.02% to 1% by mass with respect to the total mass of the liquid crystal compound.

—Chiral Agent (Optically Active Compound)—

The chiral agent has a function of inducing a helical structure of a cholesteric liquid crystalline phase. Since the chiral agent has a different twisted direction or helical pitch of the helix induced by the compound, it may be selected according to the purpose.

The chiral agent is not particularly limited, and known compounds (for example, Liquid Crystal Device Handbook, Chapter 3, Section 4-3, chiral agents for TN (twisted nematic), STN (Super Twisted Nematic), p. 199, edited by the 142nd Committee of the Japan Society for the Promotion of Science, 1989), isosorbide, isomannide derivatives, and the like can be used.

The chiral agent generally contains an asymmetric carbon atom, but an axially asymmetric compound or a planarly asymmetric compound that does not contain an asymmetric carbon atom can also be used as the chiral agent. Examples of the axially asymmetric compound or the planarly asymmetric compound include binaphthyl, helicene, paracyclophane, and derivatives thereof. The chiral agent may have a polymerizable group. In a case where both the chiral agent and the liquid crystal compound have a polymerizable group, a polymer having a repeating unit derived from the polymerizable liquid crystal compound and a repeating unit derived from the chiral agent can be formed by the polymerization reaction of the polymerizable chiral agent with the polymerizable liquid crystal compound. In this aspect, the polymerizable group of the polymerizable chiral agent is preferably a group of the same type as the polymerizable group of the polymerizable liquid crystal compound. Therefore, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent has a photoisomerizing group, it is preferable because a pattern of a desired reflection wavelength corresponding to the luminescence wavelength can be formed by irradiation with a photo mask such as an active ray after coating and alignment. The photoisomerizing group is preferably an isomerization site of a compound exhibiting photochromic properties, an azo group, an azoxy group, or a cinnamoyl group. Specific compounds of the chiral agent that can be used include the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, JP2003-313292A, and the like.

The content of the chiral agent in the liquid crystal composition is preferably 0.01 to 200 mol % and more preferably 1 to 30 mol % with respect to the molar content of the liquid crystal compound.

—Polymerization Initiator—

In a case where the liquid crystal composition contains a polymerizable compound, the composition preferably contains a polymerization initiator. In the aspect in which the polymerization reaction is allowed to proceed by irradiation with ultraviolet rays, the polymerization initiator used is preferably a photopolymerization initiator capable of initiating the polymerization reaction upon irradiation with ultraviolet rays.

Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the photopolymerization initiator in the liquid crystal composition is preferably 0.1% to 20% by mass and more preferably 0.5% to 12% by mass with respect to the content of the liquid crystal compound.

—Crosslinking Agent—

The liquid crystal composition may optionally contain a crosslinking agent in order to improve the film hardness and durability after curing. Those that are cured by ultraviolet rays, heat, moisture, and the like can be suitably used as the crosslinking agent.

The crosslinking agent is not particularly limited and may be appropriately selected depending on the intended purpose. Examples of the crosslinking agent include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris [3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. In addition, a known catalyst can be used depending on the reactivity of the crosslinking agent, and therefore the productivity can be improved in addition to the improvement of the film hardness and the durability. These crosslinking agent compounds may be used alone or in combination of two or more thereof.

The content of the crosslinking agent is preferably 3% to 20% by mass and more preferably 5% to 15% by mass with respect to the solid content mass of the liquid crystal composition. In a case where the content of the crosslinking agent is within the above range, the effect of improving the crosslinking density can be easily obtained, and the stability of the cholesteric liquid crystalline phase is further improved.

—Other Additives—

If necessary, a polymerization inhibitor, an antioxidant, an ultraviolet absorber, a light stabilizer, a coloring material, a metal oxide fine particle, or the like can be further added to the liquid crystal composition within a range that does not deteriorate the optical performance and the like.

The liquid crystal composition is preferably used as a liquid in a case of forming a patterned cholesteric liquid crystal layer.

The liquid crystal composition may contain a solvent. The solvent is not limited and may be appropriately selected depending on the intended purpose. The solvent is preferably an organic solvent.

The organic solvent is not limited and may be appropriately selected depending on the intended purpose. Examples of the organic solvent include ketones, alkyl halides, amides, sulfoxides, heterocyclic compounds, hydrocarbons, esters, and ethers. These solvent compounds may be used alone or in combination of two or more thereof. Among these solvent compounds, ketones are preferable in consideration of the burden on the environment.

In a case of forming a patterned cholesteric liquid crystal layer, it is preferable to carry out such a way that a liquid crystal composition is applied onto a forming surface of the patterned cholesteric liquid crystal layer to align a liquid crystal compound in the state of a cholesteric liquid crystalline phase, and then the liquid crystal compound is cured to form a patterned cholesteric liquid crystal layer.

That is, in a case where a patterned cholesteric liquid crystal layer is formed on the alignment film 32, it is preferable to form the patterned cholesteric liquid crystal layer in which a liquid crystal composition is applied onto the alignment film 32 to align a liquid crystal compound in the state of a cholesteric liquid crystalline phase, and then the liquid crystal compound is cured to fix the cholesteric liquid crystalline phase.

For the application of the liquid crystal composition, printing methods such as ink jetting and scroll printing, and known methods such as spin coating, bar coating, and spray coating that can uniformly apply a liquid to a sheet-like material can be used.

The applied liquid crystal composition is dried and/or heated as needed and then cured to form a patterned cholesteric liquid crystal layer. In this drying and/or heating step, the liquid crystal compound in the liquid crystal composition may be aligned into a cholesteric liquid crystalline phase. In a case of carrying out heating, the heating temperature is preferably 200° C. or lower and more preferably 130° C. or lower.

The aligned liquid crystal compound is further polymerized, if necessary. The polymerization may be either thermal polymerization or photopolymerization by light irradiation, but photopolymerization is preferable. It is preferable to use ultraviolet rays for light irradiation. The irradiation energy is preferably 20 mJ/cm$^2$ to 50 J/cm$^2$, and more preferably 50 to 1500 mJ/cm$^2$. In order to promote the photopolymerization reaction, the light irradiation may be carried out under heating conditions or a nitrogen atmosphere. The wavelength of the ultraviolet rays for irradiation is preferably 250 to 430 nm.

The thickness of the patterned cholesteric liquid crystal layer is not limited, and the thickness at which the required reflectivity of light can be obtained may be appropriately set according to the application of the reflective type liquid crystal diffractive element 19, the reflectivity of light required for the patterned cholesteric liquid crystal layer, the material for forming the patterned cholesteric liquid crystal layer, and the like.

<<Liquid Crystal Alignment Pattern of Patterned Cholesteric Liquid Crystal Layer>>

As described above, in the reflective type liquid crystal diffractive element 19, the patterned cholesteric liquid crystal layer has a liquid crystal alignment pattern in which the direction of the optical axis 40A derived from the liquid crystal compound 40 forming the cholesteric liquid crystalline phase changes while continuously rotating in one direction in the plane of the patterned cholesteric liquid crystal layer.

The optical axis 40A derived from the liquid crystal compound 40 is a so-called slow axis having the highest refractive index in the liquid crystal compound 40. For example, in a case where the liquid crystal compound 40 is a rod-like liquid crystal compound, the optical axis 40A is along the major axis direction of the rod shape. In the following description, the optical axis 40A derived from the liquid crystal compound 40 is also referred to as "optical axis 40A of liquid crystal compound 40" or "optical axis 40A".

FIG. 17 conceptually shows a plan view of the patterned cholesteric liquid crystal layer 34.

The plan view is a view of the reflective type liquid crystal diffractive element 19 viewed from above in FIG. 17, that is, a view of the reflective type liquid crystal diffractive element 19 viewed from the thickness direction (=the laminating direction of each layer (film)).

In addition, in FIG. 17, the liquid crystal compound 40 shows only the liquid crystal compound 40 on the surface of the alignment film 32, in order to clearly show the configuration of the reflective type liquid crystal diffractive element 19 (patterned cholesteric liquid crystal layer 34).

As shown in FIG. 17, on the surface of the alignment film 32, the liquid crystal compound 40 constituting the patterned cholesteric liquid crystal layer 34 has a liquid crystal alignment pattern in which the direction of the optical axis 40A changes while continuously rotating along a predetermined one direction indicated by the arrow X1, in the plane of the reflective type liquid crystal diffractive element 19, according to the alignment pattern formed on the lower alignment film 32. The illustrated example has a liquid crystal alignment pattern in which the optical axis 40A of the liquid crystal compound 40 changes while continuously rotating clockwise along the arrow X1 direction.

The liquid crystal compound 40 constituting the patterned cholesteric liquid crystal layer 34 is in a state of being two-dimensionally arranged in a direction orthogonal to the arrow X1 and this one direction (arrow X1 direction).

In the following description, the direction orthogonal to the arrow X1 direction is conveniently referred to as the Y direction. That is, the arrow Y direction is a direction orthogonal to one direction in which the direction of the optical axis 40A of the liquid crystal compound 40 changes while continuously rotating in the plane of the patterned cholesteric liquid crystal layer. Therefore, in FIG. 16 and FIG. 19 described later, the Y direction is the direction perpendicular to the paper surface.

Specifically, the fact that the direction of the optical axis 40A of the liquid crystal compound 40 changes while continuously rotating in the arrow X1 direction (a predetermined one direction) means that the angle formed by the optical axis 40A of the liquid crystal compound 40 arranged along the arrow X1 direction and the arrow X1 direction differs depending on the position in the arrow X1 direction, and the angle formed by the optical axis 40A and the arrow X1 direction sequentially changes from θ to θ+180° or θ−180° along the arrow X1 direction.

The difference in the angles of the optical axes 40A of the liquid crystal compounds 40 adjacent to each other in the arrow X1 direction is preferably 45° or less, more preferably 15 or less, and still more preferably a smaller angle.

On the other hand, the liquid crystal compound 40 forming the patterned cholesteric liquid crystal layer 34 has the same direction of the optical axis 40A in the Y direction orthogonal to the arrow X1 direction, that is, in the Y direction orthogonal to one direction in which the optical axis 40A continuously rotates.

In other words, the liquid crystal compound 40 forming the patterned cholesteric liquid crystal layer 34 has the same angle formed by the optical axis 40A of the liquid crystal compound 40 and the arrow X1 direction in the Y direction.

In the patterned cholesteric liquid crystal layer 34, in such a liquid crystal alignment pattern of the liquid crystal compound 40, the length (distance) at which the optical axis 40A of the liquid crystal compound 40 rotates 180° in the arrow X1 direction in which the optical axis 40A continuously rotates and changes in the plane is defined as the length Λ of one period in the liquid crystal alignment pattern.

That is, the distance between the centers of the two liquid crystal compounds 40 having the same angle with respect to the arrow X1 direction in the arrow X1 direction is defined as the length Λ of one period. Specifically, as shown in FIG. 17, the distance between the centers of the two liquid crystal compounds 40 in which the arrow X1 direction and the direction of the optical axis 40A coincide with each other in the arrow X1 direction is defined as the length Λ of one period. In the following description, the length Λ of one period is also referred to as "one period Λ".

The liquid crystal alignment pattern of the patterned cholesteric liquid crystal layer 34 repeats this one period Λ in the arrow X1 direction, that is, in one direction in which the direction of the optical axis 40A continuously rotates and changes.

The cholesteric liquid crystal layer in which the cholesteric liquid crystalline phase is fixed usually specularly reflects the incident light (circularly polarized light).

On the other hand, the patterned cholesteric liquid crystal layer 34 reflects the incident light at an angle in the arrow X1 direction with respect to specular reflection. The patterned cholesteric liquid crystal layer 34 has a liquid crystal alignment pattern in which the optical axis 40A changes while continuously rotating along the arrow X1 direction (a predetermined one direction) in the plane. Hereinafter, this will be described with reference to FIG. 19.

As an example, it is assumed that the patterned cholesteric liquid crystal layer 34 is a patterned cholesteric liquid crystal layer that selectively reflects the dextrorotatory circularly polarized light $R_R$ of red light. Therefore, in a case where light is incident on the patterned cholesteric liquid crystal layer 34, the patterned cholesteric liquid crystal layer 34 reflects only the dextrorotatory circularly polarized light $R_R$ of red light and transmits the other light.

In the patterned cholesteric liquid crystal layer 34, the optical axis 40A of the liquid crystal compound 40 changes while rotating along the arrow X1 direction (one direction). The liquid crystal alignment pattern formed on the patterned cholesteric liquid crystal layer 34 is a periodic pattern in the arrow X1 direction. Therefore, as conceptually shown in FIG. 19, the dextrorotatory circularly polarized light $R_R$ of red light incident on the patterned cholesteric liquid crystal layer 34 is reflected (diffracted) in the direction corresponding to the period of the liquid crystal alignment pattern, and the reflected dextrorotatory circularly polarized light $R_R$ of red light is reflected (diffracted) in the direction inclined in the arrow X1 direction with respect to the XY plane (main surface of the cholesteric liquid crystal layer).

Therefore, the reflection direction of the dextrorotatory circularly polarized light $R_R$ of red light can be adjusted by appropriately setting the arrow X1 direction, which is one direction in which the optical axis 40A rotates.

Figure 19:
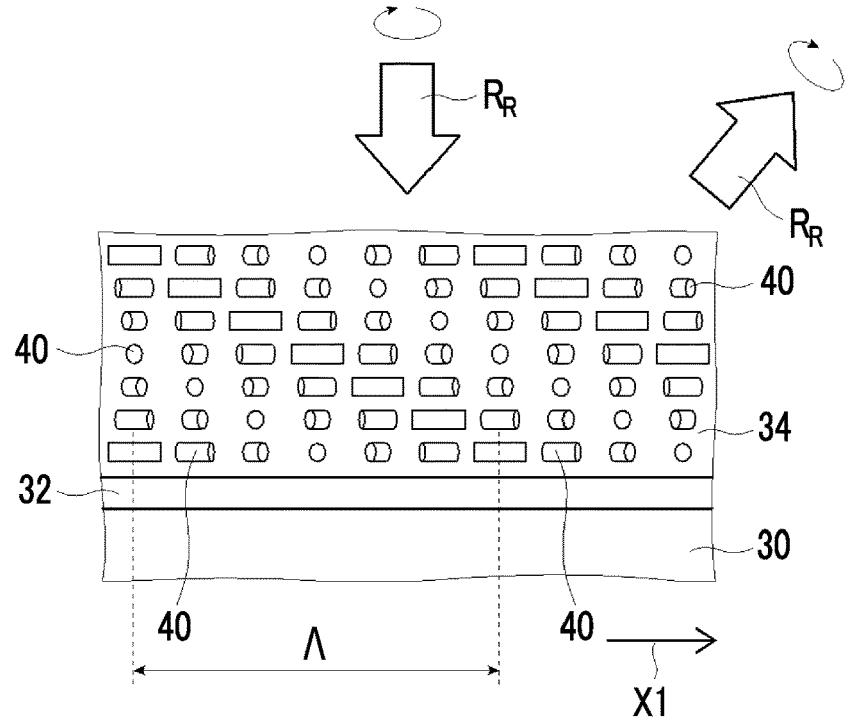
FIG. 19 is a conceptual diagram for explaining the operation of the reflective type liquid crystal diffractive element shown in FIG. 16.

That is, in a case where the arrow X1 direction is reversed, the reflection direction of the dextrorotatory circularly polarized light $R_R$ of red light is also opposite to that in FIG. 17 and FIG. 19.

In addition, the reflection direction of the dextrorotatory circularly polarized light RR of red light can be reversed by reversing the rotation direction of the optical axis 40A of the liquid crystal compound 40 toward the arrow X1 direction.

That is, in FIG. 17 and FIG. 19, the rotation direction of the optical axis 40A toward the arrow X1 direction is clockwise, and the dextrorotatory circularly polarized light $R_R$ of red light is reflected at an angle in the arrow X1 direction, but by making the rotation direction of the optical axis 40A counterclockwise, the dextrorotatory circularly polarized light $R_R$ of red light is reflected at an angle in the direction opposite to the arrow X1 direction.

Further, in the patterned cholesteric liquid crystal layer having the same liquid crystal alignment pattern, the reflection direction is reversed depending on the helical turning direction of the liquid crystal compound 40, that is, the turning direction of the reflected circularly polarized light.

The patterned cholesteric liquid crystal layer 34 shown in FIG. 19 has a helical turning direction that is right-twisted, selectively reflects dextrorotatory circularly polarized light, and has a liquid crystal alignment pattern in which the optical axis 40A rotates clockwise along the arrow X1 direction, so that the dextrorotatory circularly polarized light is reflected at an angle in the arrow X1 direction.

Therefore, the patterned cholesteric liquid crystal layer having a liquid crystal alignment pattern in which the helical turning direction is left-twisted, levorotatory circularly polarized light is selectively reflected, and the optical axis 40A rotates clockwise along the arrow X1 direction reflects the levorotatory circularly polarized light at an angle in the direction opposite to the arrow X1 direction.

In the patterned cholesteric liquid crystal layer having a liquid crystal alignment pattern, the shorter one period Λ is, the larger the angle of the reflected light with respect to the incident light is. That is, the shorter the one period Λ is, the more the reflected light can be reflected at an angle with respect to the incident light.

[Incident Diffractive Element]

The incident diffractive element may be a transmissive type diffractive element or a reflective type diffractive element. That is, the above-mentioned reflective type liquid crystal diffractive element and linear Fresnel lens type diffractive element can be used as the reflective type incident diffractive element. In addition, a surface relief type diffractive element, a volume hologram type diffractive element, and a transmissive type liquid crystal diffractive element can be used as the transmissive type diffractive element.

Hereinafter, the configuration of each diffractive element will be described.

(Surface Relief Type Diffractive Element)

Figure 20:
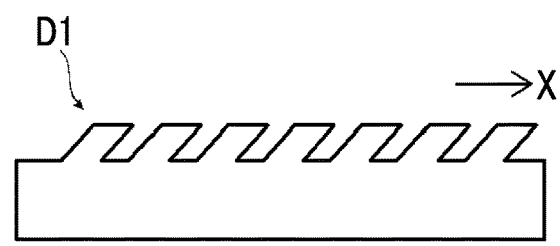
FIG. 20 is a cross-sectional view conceptually showing a surface relief type diffractive element.

A known surface relief type diffractive element can be used as the surface relief type diffractive element. As shown in D1 illustrated in FIG. 20, the surface relief type diffractive element is configured such that linear fine concavities and convexities are alternately arranged on the surface in parallel at a predetermined period. The period, material, height of the convex portion, and the like of the diffractive structure may be appropriately set according to the diffraction wavelength range.

In addition, the surface relief type diffractive element may have a diffractive structure (concave-convex structure) formed on the surface of a film-like material consisting of a resin or the like, or may have a diffractive structure (concave-convex structure) formed directly on the surface of a light guide plate.

(Volume Hologram Type Diffractive Element)

Figure 21:
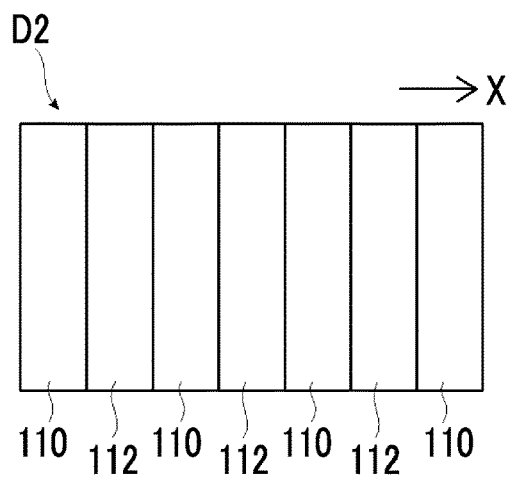
FIG. 21 is a front view conceptually showing a volume hologram type diffractive element.

A known volume hologram type diffractive element can be used as the volume hologram type diffractive element. As shown in D2 illustrated in FIG. 21, the volume hologram type diffractive element is configured such that linear regions 110 having a high refractive index and linear regions 112 having a low refractive index are alternately arranged in parallel at a predetermined period. The period, material, the refractive index of each region, and the like of the diffractive structure may be appropriately set according to the diffraction wavelength range.

(Transmissive Type Liquid Crystal Diffractive Element)

The transmissive type liquid crystal diffractive element is a liquid crystal diffractive element which has a liquid crystal alignment pattern that is continuously rotated along at least one in-plane direction, and in which the liquid crystal compound does not form a cholesteric liquid crystalline phase in a thickness direction. The liquid crystal diffractive element may have a configuration in which the liquid crystal compound is twisted and rotated in a thickness direction to the extent that the liquid crystal compound does not become a cholesteric liquid crystalline phase.

Figure 22:
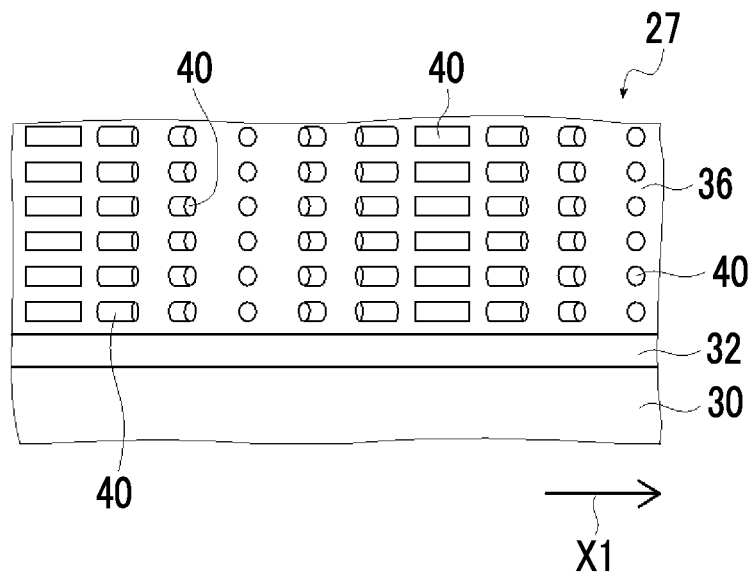
FIG. 22 is a view conceptually showing an example of a transmissive type liquid crystal diffractive element.
Figure 23:
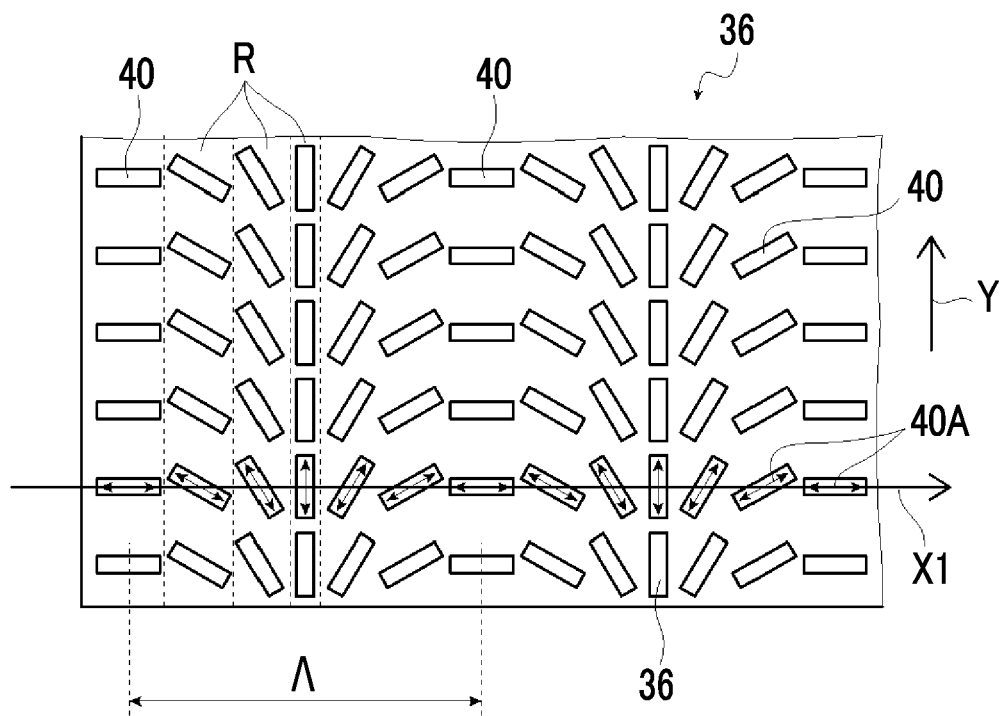
FIG. 23 is a plan view of the liquid crystal diffractive element shown in FIG. 22.

FIG. 22 and FIG. 23 illustrate a transmissive type liquid crystal diffractive element, an example of which will be described.

A transmissive type liquid crystal diffractive element 27 shown in FIG. 22 and FIG. 23 has a support 30, an alignment film 32, and a patterned liquid crystal layer 36.

As shown in FIG. 23, similar to the patterned cholesteric liquid crystal layer 34, the patterned liquid crystal layer 36 of the transmissive type liquid crystal diffractive element 27 also has a liquid crystal alignment pattern in which the optical axis 40A of the liquid crystal compound 40 continuously rotates along the arrow X1 direction. Note that FIG. 23 also shows only the liquid crystal compound on the surface of the alignment film 32, as in FIG. 17 described above.

In the transmissive type liquid crystal diffractive element 27, the liquid crystal compound 40 forming the patterned liquid crystal layer 36 is not twisted and rotated helically in a thickness direction, and the optical axis 40A is located at the same position in a plane direction. Such a liquid crystal layer can be formed by not adding a chiral agent to the liquid crystal composition in the formation of the above-mentioned patterned cholesteric liquid crystal layer.

As described above, the patterned liquid crystal layer 36 has a liquid crystal alignment pattern in which the direction of the optical axis 40A derived from the liquid crystal compound 40 changes in the plane while continuously rotating along the arrow X direction, that is, one direction indicated by arrow X.

On the other hand, the liquid crystal compound 40 forming the patterned liquid crystal layer 36 is such that the liquid crystal compounds 40 having the same direction of the optical axis 40A are arranged at equal intervals in the Y direction orthogonal to the arrow X1 direction, that is, in the Y direction orthogonal to one direction in which the optical axis 40A continuously rotates.

In other words, in the liquid crystal compound 40 forming the patterned liquid crystal layer 36, the angles formed by the direction of the optical axis 40A and the arrow X1 direction are equal among the liquid crystal compounds 40 arranged in the Y direction.

In the patterned liquid crystal layer 36, the liquid crystal compounds arranged in the Y direction have the same angle formed by the optical axis 40A and the arrow X direction (one direction in which the direction of the optical axis of the liquid crystal compound 40 rotates). The region where the liquid crystal compounds 40 having the same angle formed by the optical axis 40A and the arrow X direction are arranged in the Y direction is defined as a region R.

In this case, the value of the in-plane retardation (Re) in each region R is preferably half wavelength, that is, $\lambda/2$. These in-plane retardations are calculated by the product of a refractive index difference $\Delta n$ due to the refractive index anisotropy of the region R and a thickness of an optically anisotropic layer. Here, the refractive index difference due to the refractive index anisotropy of the region R in the optically anisotropic layer is a refractive index difference defined by the difference between the refractive index in the direction of the slow axis in the plane of the region R and the refractive index in the direction orthogonal to the direction of the slow axis. That is, the refractive index difference $\Delta n$ due to the refractive index anisotropy of the region R is equal to the difference between the refractive index of the liquid crystal compound 40 in the direction of the optical axis 40A and the refractive index of the liquid crystal compound 40 in the direction perpendicular to the optical axis 40A in the plane of the region R. That is, the refractive index difference $\Delta n$ is equal to the difference in the refractive index of the liquid crystal compound 40.

In a case where circularly polarized light is incident on the patterned liquid crystal layer 36, the light is refracted and the direction of circularly polarized light is changed.

Figure 24:
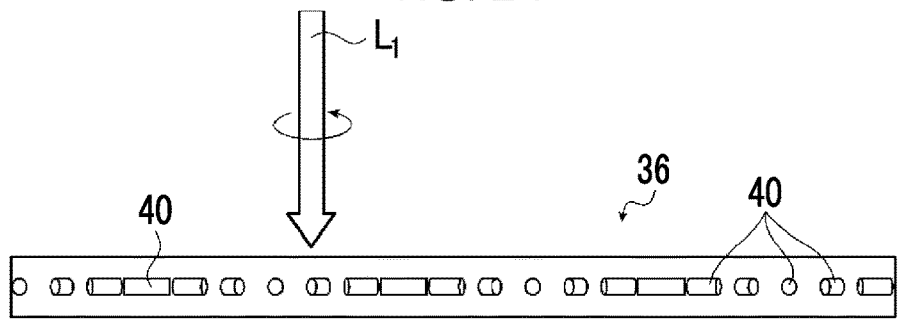
FIG. 24 is a conceptual diagram for explaining the operation of the liquid crystal diffractive element shown in FIG. 22.
Figure 25:
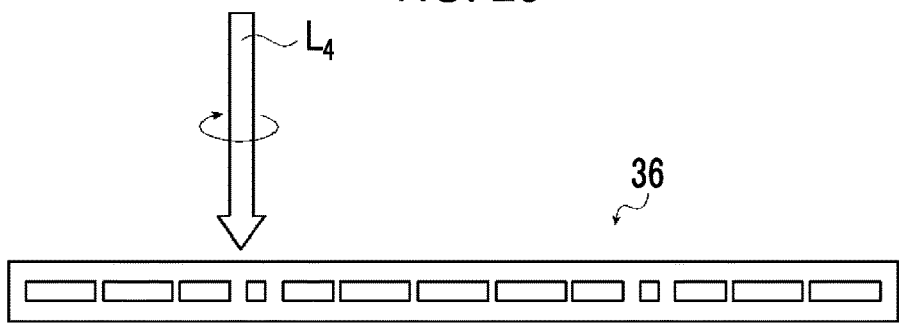
FIG. 25 is a conceptual diagram for explaining the operation of the liquid crystal diffractive element shown in FIG. 22.

This effect is conceptually shown in FIG. 24 and FIG. 25. The patterned liquid crystal layer 36 is assumed such that the value of the product of the difference in the refractive index of the liquid crystal compound and the thickness of the optically anisotropic layer is $\lambda/2$.

As shown in FIG. 24, in a case where the value of the product of the difference in the refractive index of the liquid crystal compound of the patterned liquid crystal layer 36 and the thickness of the optically anisotropic layer is $\lambda/2$, and then in a case where the incident light $L_1$ which is levorotatory circularly polarized light is incident on the patterned liquid crystal layer 36, the incident light $L_1$ is given a phase difference of 180° by passing through the patterned liquid crystal layer 36, and the transmitted light $L_2$ is converted into dextrorotatory circularly polarized light.

In addition, since the liquid crystal alignment pattern formed on the patterned liquid crystal layer 36 is a periodic pattern in the arrow X1 direction, the transmitted light $L_2$ travels in a direction different from the traveling direction of the incident light $L_1$. In this manner, the incident light $L_1$ of levorotatory circularly polarized light is converted into the transmitted light $L_2$ of dextrorotatory circularly polarized light tilted by a certain angle in the arrow X1 direction with respect to the incident direction.

On the other hand, as shown in FIG. 25, in a case where the value of the product of the difference in the refractive index of the liquid crystal compound of the patterned liquid crystal layer 36 and the thickness of the optically anisotropic layer is $\lambda/2$, and then in a case where the incident light $L_4$ of dextrorotatory circularly polarized light is incident on the patterned liquid crystal layer 36, the incident light $L_4$ is given a phase difference of 180° by passing through the patterned liquid crystal layer 36, and is converted into the transmitted light $L_5$ of levorotatory circularly polarized light.

In addition, since the liquid crystal alignment pattern formed on the patterned liquid crystal layer 36 is a periodic pattern in the arrow X1 direction, the transmitted light $L_5$ travels in a direction different from the traveling direction of the incident light $L_4$. In this manner, the incident light $L_4$ is converted into the transmitted light $L_5$ of levorotatory circularly polarized light tilted by a certain angle in a direction opposite to the arrow X1 direction with respect to the incident direction.

Similar to the patterned cholesteric liquid crystal layer 34, the patterned liquid crystal layer 36 can also adjust the refraction angles of the transmitted light $L_2$ and $L_5$ by changing one period $\Lambda$ of the formed liquid crystal alignment pattern. Specifically, in the patterned liquid crystal layer 36 as well, the shorter one period $\Lambda$ of the liquid crystal alignment pattern, the stronger the interference between the lights that have passed through the liquid crystal compounds 40 adjacent to each other, so that the transmitted light $L_2$ and $L_5$ can be greatly refracted.

In addition, the refraction direction of the transmitted light can be reversed by reversing the rotation direction of the optical axis 40A of the liquid crystal compound 40, which rotates along the arrow X1 direction. That is, in the examples shown in FIG. 22 to FIG. 25, the rotation direction of the optical axis 40A toward the arrow X1 direction is clockwise, but the refraction direction of the transmitted light can be reversed by making this rotation direction counterclockwise.

From the viewpoint of diffraction efficiency, even in a case where such a transmissive type liquid crystal diffractive element that transmits and diffracts incident light is used, it is preferable to use a liquid crystal diffractive element having a region in which the liquid crystal compound is twisted and rotated (twisted angle is less than 360°).

Here, the patterned cholesteric liquid crystal layer 34 shown in FIG. 16 and the patterned liquid crystal layer 36 shown in FIG. 22 each exhibit a configuration in which the optical axis of the liquid crystal compound is parallel to the main surface of the liquid crystal layer (liquid crystal diffractive element), but the present invention is not limited thereto.

Figure 26:
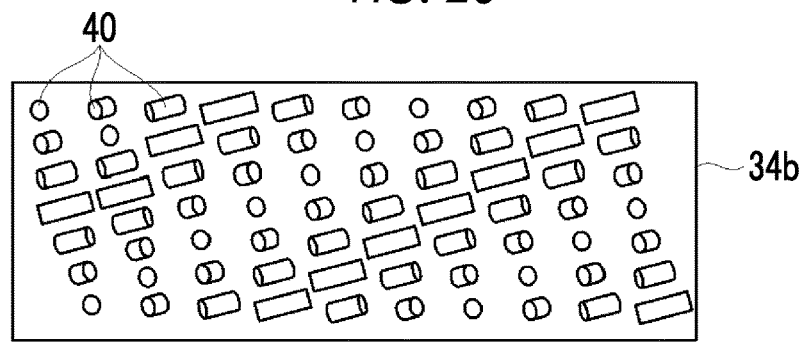
FIG. 26 is a conceptual diagram for explaining another example of the reflective type liquid crystal diffractive element.
Figure 27:
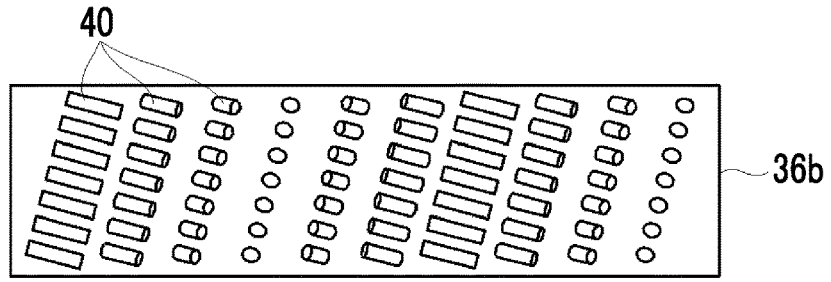
FIG. 27 is a conceptual diagram for explaining another example of the transmissive type liquid crystal diffractive element.

For example, as in a patterned cholesteric liquid crystal layer 34b shown in FIG. 26, the optical axis of the liquid crystal compound may be inclined to the main surface of the liquid crystal layer (liquid crystal diffractive element) in the above-mentioned patterned cholesteric liquid crystal layer. In addition, as in a patterned liquid crystal layer 36b shown in FIG. 27, the optical axis of the liquid crystal compound may be inclined to the main surface of the liquid crystal layer (liquid crystal diffractive element) in the above-mentioned patterned liquid crystal layer. These liquid crystal layers are similar to the above-mentioned patterned cholesteric liquid crystal layer 34 and patterned liquid crystal layer 36 in that those liquid crystal layers have a liquid crystal alignment pattern in which the direction of the optical axis derived from the liquid crystal compound changes while continuously rotating along one in-plane direction. That is, the plan view of the patterned cholesteric liquid crystal layer 34b and the plan view of the patterned liquid crystal layer 36b are the same as those in FIG. 17.

In the following description, a configuration in which the optical axis of the liquid crystal compound is inclined to the main surface of the liquid crystal layer (patterned cholesteric liquid crystal layer and patterned liquid crystal layer) is also referred to as having a pretilt angle.

The liquid crystal layer may have a configuration in which the optical axis of the liquid crystal compound has a pretilt angle at one interface of the upper and lower interfaces, or may have a configuration in which the optical axis of the liquid crystal compound has a pretilt angle at both interfaces. In addition, the pretilt angle may be different at both interfaces.

In a case where the liquid crystal layer has a pretilt angle on the surface, even a bulk portion further away from the surface is affected by the surface and has a tilt angle. The pre-tilt (inclination) of the liquid crystal compound in this way increases the effective birefringence index of the liquid crystal compound in a case where light is diffracted, which makes it possible to improve the diffraction efficiency.

The pretilt angle can be measured by cutting the liquid crystal layer with a microtome and observing the cross section of the cut liquid crystal layer with a polarization microscope.

In the present invention, the light vertically incident on the liquid crystal diffractive element (liquid crystal layer) travels diagonally in an oblique direction in the liquid crystal layer due to a bending force applied. In a case where the light travels in the liquid crystal layer, a diffraction loss occurs because the deviation from the conditions such as the diffraction period originally set so as to obtain a desired diffraction angle with respect to the vertical incidence occurs.

In a case where the liquid crystal compound is tilted, there is an azimuth direction in which a higher birefringence index is generated with respect to the azimuth direction in which the light is diffracted, as compared with a case where the liquid crystal compound is not tilted. In this direction, the effective abnormal light refractive index becomes large, so that the birefringence index, which is the difference between the abnormal light refractive index and the normal light refractive index, becomes high.

By setting the azimuth direction of the pretilt angle according to the intended diffraction azimuth direction, it is possible to suppress the deviation from the original diffraction condition in that azimuth direction, and as a result, it is considered that higher diffraction efficiency can be obtained in a case where a liquid crystal compound having a pretilt angle is used.

In addition, it is desirable that the pretilt angle is controlled by the treatment of the interface of the liquid crystal layer. At the interface on the support side, the pretilt angle of the liquid crystal compound can be controlled by subjecting the alignment film to a pretilt treatment. For example, by exposing the alignment film to ultraviolet rays from the front and then diagonally exposing the alignment film at the time of forming the alignment film, a pretilt angle can be generated in the liquid crystal compound in the liquid crystal layer formed on the alignment film. In this case, the liquid crystal compound is pre-tilted in a direction in which the uniaxial side of the liquid crystal compound can be seen with respect to the second irradiation direction. Meanwhile, since the liquid crystal compound in an azimuth direction perpendicular to the second irradiation direction does not pre-tilt, there are a region that pre-tilts in the plane and a region that does not pre-tilt. This contributes to increasing the birefringence most in that direction in a case where the light is diffracted in the intended azimuth direction, and is therefore suitable for increasing the diffraction efficiency.

Further, an additive that promotes a pretilt angle can also be added to the liquid crystal layer or the alignment film. In this case, an additive can be used as a factor for further increasing the diffraction efficiency.

This additive can also be used to control the pretilt angle of the interface on the air side.

Here, in a case of the patterned cholesteric liquid crystal layer, bright portions and dark portions derived from a cholesteric liquid crystalline phase are inclined with respect to the main surface in the cross section observed by a scanning electron microscope (SEM). The patterned cholesteric liquid crystal layer is preferable such that, in a case where the in-plane retardation Re is measured from a normal direction and a direction inclined with respect to a normal line, the absolute value of the measurement angle formed by the normal line and the direction in which the in-plane retardation Re is minimized in either the slow axis plane or the fast axis plane is 5° or more. In other words, it is preferable that the liquid crystal compound of the patterned cholesteric liquid crystal layer is inclined with respect to the main surface, and the inclination direction substantially coincides with bright lines and dark lines of the cholesteric liquid crystalline phase. The normal direction is a direction orthogonal to the main surface.

Since the patterned cholesteric liquid crystal layer has such a configuration, circularly polarized light can be diffracted with higher diffraction efficiency, as compared with the patterned cholesteric liquid crystal layer in which the liquid crystal compound is parallel to the main surface as shown in FIG. 16.

In the configuration in which the liquid crystal compound of the patterned cholesteric liquid crystal layer is inclined with respect to the main surface and the inclination direction substantially coincides with the bright lines and dark lines of the cholesteric liquid crystalline phase, the action of the liquid crystal compound on the reflection (diffraction) of light is increased, and therefore the diffraction efficiency can be improved. As a result, the amount of reflected light with respect to the incident light can be further improved.

On the fast axis plane or slow axis plane of the patterned cholesteric liquid crystal layer, the absolute value of the optical axis tilt angle of the patterned cholesteric liquid crystal layer is 5° or more, preferably 15° or more, and more preferably 20° or more.

By setting the absolute value of the optical axis tilt angle to 15° or more, it is more suitable in that the direction of the liquid crystal compound coincides with the bright portions and the dark portions, and the diffraction efficiency can be improved.

In addition, combination with a non-contact type touch sensor represented by an infrared sensor can provide a non-contact type display device that touches an aerial image. For example, it is possible to input characters and numbers or switch screens. In addition, it is also possible to add a function of tactile recognition in combination with air radiation, a ultrasonic wave, an electrical signal, or the like at any time.

Although the image display apparatus according to the embodiment of the present invention has been described in detail above, the present invention is not limited to the above-mentioned examples, and various improvements or modifications may also be made without departing from the spirit and scope of the present invention.

EXAMPLES

The features of the present invention will be described in more detail with reference to the following examples. The materials, reagents, used amounts, substance amounts, ratios, treatment details, treatment procedures, and the like shown in the following Examples can be appropriately changed without departing from the spirit of the present invention. Therefore, the scope of the present invention should not be construed as being limited by the specific examples described below.

Example 1

A model of the image display apparatus having the configuration shown in FIG. 1 was prepared, and the operation thereof was examined by simulation.

The simulation was carried out using the ray tracing software Lighting Simulator CAD (manufactured by BEST MEDIA Co., Ltd.).

The light guide plate is made of a material having a refractive index of 1.5, has a width of 50 mm, a length of 120 mm, and a height of 15 mm, and has one side surface (incident surface) in a longitudinal direction inclined by 45° with respect to the main surface.

It is assumed that the first diffractive reflective element is arranged on one main surface of the end part of the light guide plate opposite to the incident surface side. The first diffractive reflective element has a characteristic of reflecting light incident from 45° in a normal direction (0°).

It is assumed that the retroreflective element is arranged on the other main surface of the end part of the light guide plate opposite to the incident surface side. The retroreflective element has a characteristic of reflecting light incident from a normal direction (0°) in the normal direction (0°).

Figure 28:
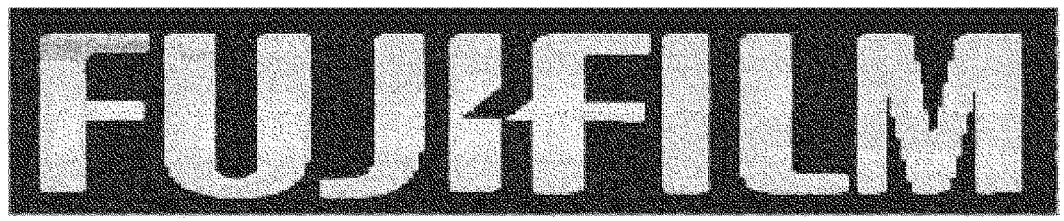
FIG. 28 is an image incident by simulation.

In the model of the image display apparatus having such a configuration, the simulation was carried out assuming that the image shown in FIG. 28 is incident on the light guide plate from the incident surface.

Figure 29:
FIG. 29 is an image of an aerial image formed by simulation.

As a result, it was confirmed that the aerial image shown in FIG. 29 was formed at a position of 140 mm in a direction perpendicular to the retroreflective element.

From the above results, the effect of the present invention is clear.

EXPLANATION OF REFERENCES 10, 10a to 10j: image display apparatus
12, 12a to 12f: image display element
14: light guide plate
14a: incident surface
16, 16a, 16b: first diffractive reflective element
18: second diffractive reflective element
19: reflective type liquid crystal diffractive element
20, 20a to 20c: retroreflective element
22, 22a to 22f, 26: incident diffractive element
24: λ/4 plate
27: transmissive type liquid crystal diffractive element
30: support
32: alignment film
34, 34b: patterned cholesteric liquid crystal layer
36, 36b: patterned liquid crystal layer
40: liquid crystal compound
40A: optical axis
50: beads
51: reflective film
52: resin layer
53: reflective film
54: prism
60: exposure device
62: laser
64: light source
65: λ/2 plate
68: beam splitter
70A, 70B: mirror
72A, 72B: λ/4 plate
110, 112: region
200: diffractive element
202: substrate
204: reflector
206: resin layer
G1 to G7: aerial image
D1: surface relief type diffractive element
D2: volume hologram type diffractive element
P: helical pitch
Λ: one period
R: region
$L_1$, $L_4$: incident light
$L_2$, $L_5$: emitted light
M: laser light
MA, MB: ray
$P_O$: linearly polarized light
$P_R$: dextrorotatory circularly polarized light
$P_L$: levorotatory circularly polarized light

What is claimed is:

1. An image display apparatus comprising:
an image display element;
a light guide plate on which light emitted by the image display element is incident and which internally and totally reflects the light satisfying a total reflection condition to guide the light:
a retroreflective element that is provided on a surface of the light guide plate and retroreflects the light guided in the light guide plate; and
a diffractive reflective element that is arranged on a surface of the light guide plate opposite to the surface on which the retroreflective element is arranged, reflects the light guided in the light guide plate, and diffracts a traveling direction of the light in a direction of the retroreflective element at an angle deviating from the total reflection condition.

2. The image display apparatus according to claim 1, wherein the light guided in the light guide plate is circularly polarized light, and
the diffractive reflective element has circularly polarized light selectivity.

3. The image display apparatus according to claim 1, wherein the retroreflective element includes a half mirror having circularly polarized light selectivity.

4. The image display apparatus according to claim 1, wherein the light guided in the light guide plate is linearly polarized light, and
the diffractive reflective element has linearly polarized light selectivity.

5. The image display apparatus according to claim 1, wherein the retroreflective element includes a half mirror having linearly polarized light selectivity.

6. The image display apparatus according to claim 1, wherein at least one of side surfaces of the light guide plate is an incident surface on which the light emitted by the image display element is incident, and
the incident surface is inclined with respect to the surface of the light guide plate such that the incident light is incident at an angle satisfying the total reflection condition.

7. The image display apparatus according to claim 1, wherein one surface of the light guide plate is an incident surface on which the light emitted by the image display element is incident, and the image display apparatus has a diffractive element that diffracts the light emitted by the image display element at an angle satisfying the total reflection condition on the incident surface or a surface of the light guide plate facing the incident surface.

8. An image display apparatus comprising:

a plurality of image display elements;

a light guide plate on which light emitted by each of the plurality of image display elements is incident and which internally and totally reflects the light satisfying a total reflection condition to guide the light;

at least one retroreflective element that is provided on a surface of the light guide plate and retroreflects the light guided in the light guide plate; and a diffractive reflective element that is arranged on a surface of the light guide plate opposite to the surface on which the retroreflective element is arranged, reflects the light guided in the light guide plate, and diffracts a traveling direction of the light in a direction of the retroreflective element at an angle deviating from the total reflection condition, wherein the plurality of image display elements make light incident on the light guide plate from different positions in a plane direction of a main surface of the light guide plate.

9. The image display apparatus according to claim 8, wherein the light guided in the light guide plate is circularly polarized light, and the diffractive reflective element has circularly polarized light selectivity.

10. The image display apparatus according to claim 8, wherein the retroreflective element includes a half mirror having circularly polarized light selectivity.

11. The image display apparatus according to claim 8, wherein the light guided in the light guide plate is linearly polarized light, and the diffractive reflective element has linearly polarized light selectivity.

12. The image display apparatus according to claim 8, wherein the retroreflective element includes a half mirror having linearly polarized light selectivity.

13. The image display apparatus according to claim 8, wherein at least one of side surfaces of the light guide plate is an incident surface on which the light emitted by the image display element is incident, and the incident surface is inclined with respect to the surface of the light guide plate such that the incident light is incident at an angle satisfying the total reflection condition.

14. The image display apparatus according to claim 8, wherein one surface of the light guide plate is an incident surface on which the light emitted by the image display element is incident, and the image display apparatus has a diffractive element that diffracts the light emitted by the image display element at an angle satisfying the total reflection condition on the incident surface or a surface of the light guide plate facing the incident surface.

15. An image display apparatus comprising:

an image display element;

a light guide plate on which light emitted by the image display element is incident and which internally and totally reflects the light satisfying a total reflection condition to guide the light; and a retroreflective element that is provided on a surface of the light guide plate and retroreflects the light guided in the light guide plate, wherein one surface of the light guide plate is an incident surface on which the light emitted by the image display element is incident, and the image display apparatus has a diffractive element that diffracts the light emitted by the image display element at an angle satisfying the total reflection condition on the incident surface or a surface of the light guide plate facing the incident surface.

16. An image display apparatus comprising:

a plurality of image display elements;

a light guide plate on which light emitted by each of the plurality of image display elements is incident and which internally and totally reflects the light satisfying a total reflection condition to guide the light; and at least one retroreflective element that is provided on a surface of the light guide plate and retroreflects the light guided in the light guide plate, wherein the plurality of image display elements make light incident on the light guide plate from different positions in a plane direction of a main surface of the light guide plate, one surface of the light guide plate is an incident surface on which the light emitted by the image display element is incident, and the image display apparatus has a diffractive element that diffracts the light emitted by the image display element at an angle satisfying the total reflection condition on the incident surface or a surface of the light guide plate facing the incident surface.

\* \* \* \* \*